(12) United States Patent
Noyes

(10) Patent No.: US 11,951,428 B2
(45) Date of Patent: Apr. 9, 2024

(54) SOLID CARBON PRODUCTS COMPRISING COMPRESSED CARBON NANOTUBES IN A CONTAINER AND METHODS OF FORMING SAME

(71) Applicant: Seerstone LLC, Provo, UT (US)

(72) Inventor: Dallas B. Noyes, Provo, UT (US)

(73) Assignee: Seerstone, LLC, Provo, UT (US)

( * ) Notice: Subject to any disclaimer, the term of this patent is extended or adjusted under 35 U.S.C. 154(b) by 0 days.

(21) Appl. No.: 18/359,295

(22) Filed: Jul. 26, 2023

(65) Prior Publication Data

US 2023/0372851 A1 Nov. 23, 2023

Related U.S. Application Data

(62) Division of application No. 16/320,361, filed as application No. PCT/US2017/044380 on Jul. 28, 2017, now Pat. No. 11,752,459.

(Continued)

(51) Int. Cl.
*B01D 39/20* (2006.01)
*C04B 35/528* (2006.01)
*C04B 35/645* (2006.01)

(52) U.S. Cl.
CPC ..... *B01D 39/2044* (2013.01); *B01D 39/2062* (2013.01); *C04B 35/528* (2013.01);
(Continued)

(58) Field of Classification Search
None
See application file for complete search history.

(56) References Cited

U.S. PATENT DOCUMENTS 1,478,730 A 12/1923 Brownlee et al.
1,735,925 A 11/1929 Jaeger
(Continued)

FOREIGN PATENT DOCUMENTS

CN 1658435 8/2005
EP 0198558 10/1986
(Continued)

OTHER PUBLICATIONS

Abatzoglou, Nicolas et al., "Green Diesel from Fischer-Tropsch Synthesis: Challenges and Hurdles," Proc. of the 3rd IASME/WSEAS Int. Conf. on Energy, Environment, Ecosystems and Sustainable Development, Agios Nikolaos, Greece, Jul. 24-26, 2007, pp. 223-232.

(Continued)

*Primary Examiner* — John J Figueroa
(74) *Attorney, Agent, or Firm* — ColterJennings

(57) ABSTRACT

Methods of forming solid carbon products include disposing nanostructure carbon in a container, disposing the container in a press, compressing the nanostructured carbon within the container, and fastening a lid to the container to form a filter. Further processing may include sintering the nanostructured carbon within the container and heating the nanostructured carbon within the container in an inert environment to form bonds between adjacent particles of nanostructured carbon. Other methods may include forming a plurality of compressed nanostructured carbon modules, placing the plurality of compressed nanostructured carbon modules within a container, and placing a lid on the container to form a filter structure. Related structures are also disclosed.

15 Claims, 10 Drawing Sheets

Related U.S. Application Data

(60) Provisional application No. 62/368,061, filed on Jul. 28, 2016.

(52) U.S. Cl.
CPC ...... *C04B 35/645* (2013.01); *B01D 2239/025* (2013.01); *B01D 2239/0258* (2013.01); *C04B 2235/5288* (2013.01); *C04B 2235/77* (2013.01)

(56) References Cited

U.S. PATENT DOCUMENTS

| | | |
|---|---|---|
| 1,746,464 A | 2/1930 | Fischer et al. |
| 1,964,744 A | 2/1930 | Odell |
| 2,404,869 A | 7/1946 | Thomas |
| 2,429,980 A | 11/1947 | Allinson |
| 2,440,424 A | 4/1948 | Wiegand |
| 2,731,328 A | 1/1956 | Atkinson |
| 2,745,973 A | 5/1956 | Rappaport |
| 2,796,327 A | 6/1957 | Pollock |
| 2,796,331 A | 6/1957 | Kauffman et al. |
| 2,800,616 A | 7/1957 | Becker |
| 2,811,653 A | 10/1957 | Moore |
| 2,819,414 A | 1/1958 | Sherwood et al. |
| 2,837,666 A | 6/1958 | Linder |
| 2,976,433 A | 3/1961 | Rappaport et al. |
| 3,094,634 A | 6/1963 | Rappaport |
| 3,172,774 A | 3/1965 | Diefendorf |
| 3,249,830 A | 5/1966 | Adany |
| 3,378,345 A | 4/1968 | Bourdeau et al. |
| 3,634,999 A | 1/1972 | Howard et al. |
| 3,714,474 A | 1/1973 | Hoff |
| 3,771,959 A | 11/1973 | Fletcher et al. |
| 3,846,478 A | 11/1974 | Cummins |
| 3,905,748 A | 9/1975 | Cairo et al. |
| 4,024,420 A | 5/1977 | Anthony et al. |
| 4,126,000 A | 11/1978 | Funk |
| 4,197,281 A | 4/1980 | Muenger et al. |
| 4,200,554 A | 4/1980 | Lauder |
| 4,452,676 A | 6/1984 | Birbara |
| 4,602,477 A | 7/1986 | Lucadamo et al. |
| 4,628,143 A | 12/1986 | Brotz |
| 4,650,657 A | 3/1987 | Brooks |
| 4,663,230 A | 5/1987 | Tennett |
| 4,710,483 A | 12/1987 | Burk et al. |
| 4,725,346 A | 2/1988 | Joshi |
| 4,727,207 A | 2/1988 | Paparizos et al. |
| 4,746,458 A | 5/1988 | Brotz |
| 4,855,091 A | 8/1989 | Geus et al. |
| 4,874,407 A | 10/1989 | Lefkowitz |
| 4,900,368 A | 2/1990 | Brotz |
| 5,008,579 A | 4/1991 | Conley et al. |
| 5,021,137 A | 6/1991 | Joshi et al. |
| 5,021,139 A | 6/1991 | Hartig et al. |
| 5,082,505 A | 1/1992 | Cota et al. |
| 5,122,332 A | 6/1992 | Russell |
| 5,133,190 A | 7/1992 | Abdelmalek |
| 5,149,584 A | 9/1992 | Baker et al. |
| 5,187,030 A | 2/1993 | Firmin et al. |
| 5,260,043 A | 11/1993 | Li et al. |
| 5,260,621 A | 11/1993 | Little et al. |
| 5,316,747 A | 5/1994 | Pow et al. |
| 5,396,141 A | 3/1995 | Jantz et al. |
| 5,413,866 A | 5/1995 | Baker et al. |
| 5,456,897 A | 10/1995 | Moy et al. |
| 5,457,343 A | 10/1995 | Ajayan et al. |
| 5,526,374 A | 6/1996 | Uebber |
| 5,531,424 A | 7/1996 | Whipp |
| 5,569,635 A | 10/1996 | Moy et al. |
| 5,572,544 A | 11/1996 | Mathur et al. |
| 5,578,543 A | 11/1996 | Tennent et al. |
| 5,589,152 A | 12/1996 | Tennent et al. |
| 5,624,542 A | 4/1997 | Shen et al. |
| 5,641,466 A | 6/1997 | Ebbesen et al. |
| 5,648,056 A | 7/1997 | Tanaka |
| 5,650,370 A | 7/1997 | Tennent et al. |
| 5,691,054 A | 11/1997 | Tennent et al. |
| 5,707,916 A | 1/1998 | Snyder et al. |
| 5,711,770 A | 1/1998 | Malina |
| 5,726,116 A | 3/1998 | Moy et al. |
| 5,747,161 A | 5/1998 | Iijima |
| 5,780,101 A | 7/1998 | Nolan et al. |
| 5,859,484 A | 1/1999 | Mannik et al. |
| 5,877,110 A | 3/1999 | Snyder et al. |
| 5,910,238 A | 6/1999 | Cable et al. |
| 5,965,267 A | 10/1999 | Nolan et al. |
| 5,997,832 A | 12/1999 | Lieber et al. |
| 6,099,965 A | 8/2000 | Tennent et al. |
| 6,159,892 A | 12/2000 | Moy et al. |
| 6,183,714 B1 | 2/2001 | Smalley et al. |
| 6,203,814 B1 | 3/2001 | Fisher et al. |
| 6,221,330 B1 | 4/2001 | Moy et al. |
| 6,232,706 B1 | 5/2001 | Dai et al. |
| 6,239,057 B1 | 5/2001 | Ichikawa et al. |
| 6,261,532 B1 | 7/2001 | Ono |
| 6,262,129 B1 | 7/2001 | Murray et al. |
| 6,294,144 B1 | 9/2001 | Moy et al. |
| 6,333,016 B1 | 12/2001 | Resasco et al. |
| 6,346,189 B1 | 2/2002 | Dai et al. |
| 6,361,861 B2 | 3/2002 | Gao et al. |
| 6,375,917 B1 | 4/2002 | Mandeville et al. |
| 6,413,487 B1 | 7/2002 | Resasco et al. |
| 6,423,288 B2 | 7/2002 | Mandeville et al. |
| 6,426,442 B1 | 7/2002 | Ichikawa et al. |
| 6,465,813 B2 | 10/2002 | Ihm |
| 6,518,218 B1 | 2/2003 | Sun et al. |
| 6,596,101 B2 | 7/2003 | Weihs et al. |
| 6,645,455 B2 | 11/2003 | Margrave et al. |
| 6,683,783 B1 | 1/2004 | Smalley et al. |
| 6,686,311 B2 | 2/2004 | Sun et al. |
| 6,692,717 B1 | 2/2004 | Smalley et al. |
| 6,713,519 B2 | 3/2004 | Wang et al. |
| 6,749,827 B2 | 6/2004 | Smalley et al. |
| 6,761,870 B1 | 7/2004 | Smalley et al. |
| 6,790,425 B1 | 9/2004 | Smalley et al. |
| 6,800,369 B2 | 10/2004 | Gimzewski et al. |
| 6,812,634 B2 | 11/2004 | Murakami et al. |
| 6,827,918 B2 | 12/2004 | Margrave et al. |
| 6,827,919 B1 | 12/2004 | Moy et al. |
| 6,835,330 B2 | 12/2004 | Nishino et al. |
| 6,835,366 B1 | 12/2004 | Margrave et al. |
| 6,841,139 B2 | 1/2005 | Margrave et al. |
| 6,843,843 B2 | 1/2005 | Takahashi et al. |
| 6,855,301 B1 | 2/2005 | Rich et al. |
| 6,855,593 B2 | 2/2005 | Andoh et al. |
| 6,875,412 B2 | 4/2005 | Margrave et al. |
| 6,890,986 B2 | 5/2005 | Pruett |
| 6,899,945 B2 | 5/2005 | Smalley et al. |
| 6,905,544 B2 | 6/2005 | Setoguchi et al. |
| 6,913,740 B2 | 7/2005 | Polverejan et al. |
| 6,913,789 B2 | 7/2005 | Smalley et al. |
| 6,916,434 B2 | 7/2005 | Nishino et al. |
| 6,919,064 B2 | 7/2005 | Resasco et al. |
| 6,936,233 B2 | 8/2005 | Smalley et al. |
| 6,949,237 B2 | 9/2005 | Smalley et al. |
| 6,955,800 B2 | 10/2005 | Resasco et al. |
| 6,960,389 B2 | 11/2005 | Tennent et al. |
| 6,962,685 B2 | 11/2005 | Sun |
| 6,979,709 B2 | 12/2005 | Smalley et al. |
| 6,986,876 B2 | 1/2006 | Smalley et al. |
| 6,994,907 B2 | 2/2006 | Resasco et al. |
| 6,998,358 B2 | 2/2006 | French et al. |
| 7,011,771 B2 | 3/2006 | Gao et al. |
| 7,041,620 B2 | 5/2006 | Smalley et al. |
| 7,045,108 B2 | 5/2006 | Jiang et al. |
| 7,048,999 B2 | 5/2006 | Smalley et al. |
| 7,052,668 B2 | 5/2006 | Smalley et al. |
| 7,067,098 B2 | 6/2006 | Colbert et al. |
| 7,071,406 B2 | 7/2006 | Smalley et al. |
| 7,074,379 B2 | 7/2006 | Moy et al. |
| 7,094,385 B2 | 8/2006 | Beguin et al. |
| 7,094,386 B2 | 8/2006 | Resasco et al. |
| 7,094,679 B1 | 8/2006 | Li et al. |
| 7,097,820 B2 | 8/2006 | Colbert et al. |

(56) References Cited

U.S. PATENT DOCUMENTS

| | | |
|---|---|---|
| 7,105,596 B2 | 9/2006 | Smalley et al. |
| 7,125,534 B1 | 10/2006 | Smalley et al. |
| 7,132,062 B1 | 11/2006 | Howard |
| 7,135,159 B2 | 11/2006 | Shaffer et al. |
| 7,135,160 B2 | 11/2006 | Yang et al. |
| 7,138,100 B2 | 11/2006 | Smalley et al. |
| 7,150,864 B1 | 12/2006 | Smalley et al. |
| 7,157,068 B2 | 1/2007 | Li et al. |
| 7,160,532 B2 | 1/2007 | Liu et al. |
| 7,169,329 B2 | 1/2007 | Wong et al. |
| 7,201,887 B2 | 4/2007 | Smalley et al. |
| 7,204,970 B2 | 4/2007 | Smalley et al. |
| 7,205,069 B2 | 4/2007 | Smalley et al. |
| 7,212,147 B2 | 5/2007 | Messano |
| 7,214,360 B2 | 5/2007 | Chen et al. |
| 7,250,148 B2 | 7/2007 | Yang et al. |
| 7,270,795 B2 | 9/2007 | Kawakami et al. |
| 7,291,318 B2 | 11/2007 | Sakurabayashi et al. |
| 7,338,648 B2 | 3/2008 | Harutyunyan et al. |
| 7,365,289 B2 | 4/2008 | Wilkes et al. |
| 7,374,793 B2 | 5/2008 | Furukawa et al. |
| 7,390,477 B2 | 6/2008 | Smalley et al. |
| 7,396,798 B2 | 7/2008 | Ma et al. |
| 7,408,186 B2 | 8/2008 | Merkulov et al. |
| 7,410,628 B2 | 8/2008 | Bening et al. |
| 7,413,723 B2 | 8/2008 | Niu et al. |
| 7,452,828 B2 | 11/2008 | Hirakata et al. |
| 7,459,137 B2 | 12/2008 | Tour et al. |
| 7,459,138 B2 | 12/2008 | Resasco et al. |
| 7,473,873 B2 | 1/2009 | Biris et al. |
| 7,510,695 B2 | 3/2009 | Smalley et al. |
| 7,527,780 B2 | 5/2009 | Margrave et al. |
| 7,563,427 B2 | 7/2009 | Wei et al. |
| 7,563,428 B2 | 7/2009 | Resasco et al. |
| 7,569,203 B2 | 8/2009 | Fridman et al. |
| 7,572,426 B2 | 8/2009 | Strano et al. |
| 7,585,482 B2 | 9/2009 | Resasco et al. |
| 7,585,483 B2 | 9/2009 | Edwin et al. |
| 7,601,322 B2 | 10/2009 | Huang |
| 7,611,579 B2 | 11/2009 | Lashmore et al. |
| 7,615,204 B2 | 11/2009 | Ajayan et al. |
| 7,618,599 B2 | 11/2009 | Kim et al. |
| 7,622,059 B2 | 11/2009 | Bordere et al. |
| 7,632,569 B2 | 12/2009 | Smalley et al. |
| 7,645,933 B2 | 1/2010 | Narkis et al. |
| 7,655,302 B2 | 2/2010 | Smalley et al. |
| 7,670,510 B2 | 3/2010 | Wong et al. |
| 7,700,065 B2 | 4/2010 | Fujioka et al. |
| 7,704,481 B2 | 4/2010 | Higashi et al. |
| 7,718,283 B2 | 5/2010 | Raffaelle et al. |
| 7,719,265 B2 | 5/2010 | Harutyunyan et al. |
| 7,731,930 B2 | 6/2010 | Taki et al. |
| 7,736,741 B2 | 6/2010 | Maruyama et al. |
| 7,740,825 B2 | 6/2010 | Tohji et al. |
| 7,749,477 B2 | 7/2010 | Jiang et al. |
| 7,754,182 B2 | 7/2010 | Jiang et al. |
| 7,772,447 B2 | 8/2010 | Iaccino et al. |
| 7,780,939 B2 | 8/2010 | Margrave et al. |
| 7,785,558 B2 | 8/2010 | Hikata |
| 7,790,228 B2 | 9/2010 | Osamu et al. |
| 7,794,690 B2 | 9/2010 | Abatzoglou et al. |
| 7,794,797 B2 | 9/2010 | Vasenkov |
| 7,799,246 B2 | 9/2010 | Bordere et al. |
| 7,811,542 B1 | 10/2010 | McElrath et al. |
| 7,824,648 B2 | 11/2010 | Jiang et al. |
| 7,837,968 B2 | 11/2010 | Chang et al. |
| 7,838,843 B2 | 11/2010 | Kawakami et al. |
| 7,842,271 B2 | 11/2010 | Petrik |
| 7,854,945 B2 | 12/2010 | Fischer et al. |
| 7,854,991 B2 | 12/2010 | Hata et al. |
| 7,858,648 B2 | 12/2010 | Bianco et al. |
| 7,871,591 B2 | 1/2011 | Harutyunyan et al. |
| 7,879,398 B2 | 2/2011 | Kim et al. |
| 7,883,995 B2 | 2/2011 | Mitchell et al. |
| 7,887,774 B2 | 2/2011 | Strano et al. |
| 7,888,543 B2 | 2/2011 | Iaccino et al. |
| 7,897,209 B2 | 3/2011 | Shibuya et al. |
| 7,901,654 B2 | 3/2011 | Harutyunyan |
| 7,906,095 B2 | 3/2011 | Kawabata |
| 7,919,065 B2 | 4/2011 | Pedersen et al. |
| 7,923,403 B2 | 4/2011 | Ma et al. |
| 7,923,615 B2 | 4/2011 | Silvy et al. |
| 7,932,419 B2 | 4/2011 | Liu et al. |
| 7,947,245 B2 | 5/2011 | Tada et al. |
| 7,951,351 B2 | 5/2011 | Ma et al. |
| 7,964,174 B2 | 6/2011 | Dubin |
| 7,981,396 B2 | 7/2011 | Harutyunyan |
| 7,988,861 B2 | 8/2011 | Pham-Huu et al. |
| 7,993,594 B2 | 8/2011 | Wei et al. |
| 8,012,447 B2 | 9/2011 | Harutyunyan |
| 8,017,282 B2 | 9/2011 | Choi et al. |
| 8,017,892 B2 | 9/2011 | Biris et al. |
| 8,038,908 B2 | 10/2011 | Hirai et al. |
| 8,114,518 B2 | 2/2012 | Hata et al. |
| 8,138,384 B2 | 3/2012 | Iaccino et al. |
| 8,173,096 B2 | 5/2012 | Chang et al. |
| 8,178,049 B2 | 5/2012 | Shiraki et al. |
| 8,226,902 B2 | 7/2012 | Jang et al. |
| 8,314,044 B2 | 11/2012 | Jangbarwala |
| 8,486,362 B2 | 7/2013 | Fugetsu |
| 8,679,444 B2 | 3/2014 | Noyes |
| 8,709,373 B2 | 4/2014 | Hauge et al. |
| 8,865,613 B2 | 10/2014 | Mordkovich et al. |
| 9,084,990 B2 | 7/2015 | Silvy et al. |
| 9,090,472 B2 | 7/2015 | Noyes |
| 9,221,685 B2 | 12/2015 | Noyes |
| 9,327,970 B2 | 5/2016 | Nakamura et al. |
| 9,422,162 B2 | 8/2016 | Hocke et al. |
| 9,475,699 B2 | 10/2016 | Noyes |
| 9,504,998 B2 | 11/2016 | Koveal, Jr. et al. |
| 9,505,620 B2 | 11/2016 | Denton et al. |
| 9,556,031 B2 | 1/2017 | Noyes |
| 9,567,219 B2 | 2/2017 | Denton et al. |
| 9,586,823 B2 | 3/2017 | Noyes |
| 9,598,286 B2 | 3/2017 | Noyes |
| 9,604,848 B2 | 3/2017 | Noyes |
| 9,637,382 B2 | 5/2017 | Noyes |
| 9,650,251 B2 | 5/2017 | Noyes |
| 9,731,970 B2 | 8/2017 | Noyes |
| 9,779,845 B2 | 10/2017 | Noyes |
| 9,783,416 B2 | 10/2017 | Noyes |
| 9,796,591 B2 | 10/2017 | Noyes |
| 9,827,517 B2 * | 11/2017 | Vecitis ............ B01D 39/2055 |
| 2001/0009119 A1 | 7/2001 | Murray et al. |
| 2002/0009637 A1 | 1/2002 | Murakami et al. |
| 2002/0054849 A1 | 5/2002 | Baker |
| 2002/0102193 A1 | 8/2002 | Smalley et al. |
| 2002/0102196 A1 | 8/2002 | Smalley et al. |
| 2002/0127169 A1 | 9/2002 | Smalley et al. |
| 2002/0127170 A1 | 9/2002 | Hong et al. |
| 2002/0131910 A1 | 9/2002 | Resasco et al. |
| 2002/0172767 A1 | 11/2002 | Grigorian et al. |
| 2002/0173420 A1 | 11/2002 | Cantrell et al. |
| 2003/0059364 A1 | 3/2003 | Prilutskiy |
| 2003/0111410 A1 | 6/2003 | Branson |
| 2003/0119920 A1 * | 6/2003 | Wang ..................... C23C 8/02 518/715 |
| 2003/0147802 A1 | 8/2003 | Smalley et al. |
| 2003/0194362 A1 | 10/2003 | Rogers et al. |
| 2004/0035355 A1 | 2/2004 | Avouris et al. |
| 2004/0053440 A1 | 3/2004 | lai et al. |
| 2004/0070009 A1 | 4/2004 | Resasco et al. |
| 2004/0105807 A1 | 6/2004 | Fan et al. |
| 2004/0111968 A1 | 6/2004 | Day et al. |
| 2004/0150312 A1 | 8/2004 | McElrath et al. |
| 2004/0151654 A1 | 8/2004 | Wei et al. |
| 2004/0194705 A1 | 10/2004 | Dai et al. |
| 2004/0197260 A1 | 10/2004 | Resasco et al. |
| 2004/0202603 A1 | 10/2004 | Fischer et al. |
| 2004/0222080 A1 | 11/2004 | Tour et al. |
| 2004/0234445 A1 | 11/2004 | Serp et al. |
| 2004/0247503 A1 | 12/2004 | Hyeon |
| 2004/0265212 A1 | 12/2004 | Varadan et al. |
| 2005/0002850 A1 | 1/2005 | Niu et al. |

(56) References Cited

U.S. PATENT DOCUMENTS

| | | |
|---|---|---|
| 2005/0002851 A1 | 1/2005 | McElrath et al. |
| 2005/0025695 A1 | 2/2005 | Pradhan |
| 2005/0042162 A1 | 2/2005 | Resasco et al. |
| 2005/0046322 A1 | 3/2005 | Kim et al. |
| 2005/0074392 A1 | 4/2005 | Yang et al. |
| 2005/0079118 A1 | 4/2005 | Maruyama et al. |
| 2005/0100499 A1 | 5/2005 | Oya et al. |
| 2005/0176990 A1 | 8/2005 | Coleman et al. |
| 2005/0220695 A1 | 10/2005 | Abatzoglou et al. |
| 2005/0238810 A1 | 10/2005 | Scaringe et al. |
| 2005/0244325 A1 | 11/2005 | Nam et al. |
| 2005/0276743 A1 | 12/2005 | Tacombe et al. |
| 2006/0013757 A1 | 1/2006 | Edwin et al. |
| 2006/0032330 A1 | 2/2006 | Sato |
| 2006/0039849 A1 | 2/2006 | Resasco et al. |
| 2006/0045837 A1 | 3/2006 | Nishimura |
| 2006/0062718 A1 | 3/2006 | Bahr et al. |
| 2006/0078489 A1 | 4/2006 | Harutyunyan et al. |
| 2006/0104884 A1 | 5/2006 | Shaffer et al. |
| 2006/0104886 A1 | 5/2006 | Wilson |
| 2006/0104887 A1 | 5/2006 | Fujioka et al. |
| 2006/0130150 A1 | 6/2006 | Garza-Gonzalez et al. |
| 2006/0133990 A1 | 6/2006 | Hyeon et al. |
| 2006/0141346 A1 | 6/2006 | Gordon et al. |
| 2006/0143980 A1 | 7/2006 | Rapier et al. |
| 2006/0151382 A1* | 7/2006 | Petrik .................... A24D 3/163 210/500.21 |
| 2006/0165988 A1 | 7/2006 | Chiang et al. |
| 2006/0191835 A1 | 8/2006 | Petrik et al. |
| 2006/0199770 A1 | 9/2006 | Bianco et al. |
| 2006/0204426 A1 | 9/2006 | Akins et al. |
| 2006/0225534 A1 | 10/2006 | Swihart et al. |
| 2006/0228286 A1 | 10/2006 | Tada et al. |
| 2006/0239890 A1 | 10/2006 | Chang et al. |
| 2006/0239891 A1 | 10/2006 | Niu et al. |
| 2006/0245996 A1 | 11/2006 | Xie et al. |
| 2006/0275956 A1 | 12/2006 | Konesky |
| 2006/0286022 A1 | 12/2006 | Miyamoto et al. |
| 2007/0003470 A1 | 1/2007 | Smalley et al. |
| 2007/0020168 A1 | 1/2007 | Asmussen et al. |
| 2007/0025906 A1 | 2/2007 | Pirard et al. |
| 2007/0031320 A1 | 2/2007 | Jiang et al. |
| 2007/0080605 A1 | 4/2007 | Chandrashekhar et al. |
| 2007/0092431 A1 | 4/2007 | Resasco et al. |
| 2007/0116631 A1 | 5/2007 | Li et al. |
| 2007/0148962 A1 | 6/2007 | Kauppinen et al. |
| 2007/0149392 A1 | 6/2007 | Ku et al. |
| 2007/0154382 A1 | 7/2007 | Edwin et al. |
| 2007/0172409 A1 | 7/2007 | Hikata |
| 2007/0183959 A1 | 8/2007 | Charlier et al. |
| 2007/0189953 A1 | 8/2007 | Bai et al. |
| 2007/0207318 A1 | 9/2007 | Jin et al. |
| 2007/0209093 A1 | 9/2007 | Tohji et al. |
| 2007/0253886 A1 | 11/2007 | Abatzoglou et al. |
| 2007/0264187 A1 | 11/2007 | Harutyunyan et al. |
| 2007/0266825 A1 | 11/2007 | Ripley et al. |
| 2007/0280876 A1 | 12/2007 | Tour et al. |
| 2007/0281087 A1 | 12/2007 | Harutyunyan et al. |
| 2008/0003170 A1 | 1/2008 | Buchholz et al. |
| 2008/0003182 A1 | 1/2008 | Wilson et al. |
| 2008/0008644 A1 | 1/2008 | Resasco et al. |
| 2008/0008760 A1 | 1/2008 | Bianco et al. |
| 2008/0014654 A1 | 1/2008 | Weisman et al. |
| 2008/0095695 A1 | 4/2008 | Shanov et al. |
| 2008/0118426 A1 | 5/2008 | Li et al. |
| 2008/0134942 A1 | 6/2008 | Brenner et al. |
| 2008/0160312 A1 | 7/2008 | Furukawa et al. |
| 2008/0169061 A1 | 7/2008 | Tour et al. |
| 2008/0175785 A1 | 7/2008 | Mitra et al. |
| 2008/0176069 A1 | 7/2008 | Ma et al. |
| 2008/0182155 A1 | 7/2008 | Choi et al. |
| 2008/0193367 A1 | 8/2008 | Kalck et al. |
| 2008/0217588 A1 | 9/2008 | Arnold et al. |
| 2008/0221227 A1 | 9/2008 | Christensen et al. |
| 2008/0226538 A1 | 9/2008 | Rumpf et al. |
| 2008/0233402 A1 | 9/2008 | Carlson et al. |
| 2008/0239620 A1 | 10/2008 | Min et al. |
| 2008/0260618 A1 | 10/2008 | Kawabata |
| 2008/0263954 A1 | 10/2008 | Hammel et al. |
| 2008/0274277 A1 | 11/2008 | Rashidi et al. |
| 2008/0279753 A1 | 11/2008 | Harutyunyan et al. |
| 2008/0280136 A1 | 11/2008 | Zachariah et al. |
| 2008/0286546 A1 | 11/2008 | Lashmore et al. |
| 2008/0296537 A1 | 12/2008 | Gordon et al. |
| 2008/0299029 A1 | 12/2008 | Grosboll et al. |
| 2008/0305028 A1 | 12/2008 | McKeigue et al. |
| 2008/0305029 A1 | 12/2008 | McKeigue et al. |
| 2008/0305030 A1 | 12/2008 | McKeigue et al. |
| 2008/0318357 A1 | 12/2008 | Raffaele et al. |
| 2009/0001326 A1 | 1/2009 | Sato et al. |
| 2009/0004075 A1 | 1/2009 | Chung et al. |
| 2009/0011128 A1 | 1/2009 | Oshima et al. |
| 2009/0022652 A1 | 1/2009 | Sato et al. |
| 2009/0035569 A1 | 2/2009 | Gonzalez et al. |
| 2009/0056802 A1 | 3/2009 | Rabani |
| 2009/0074634 A1 | 3/2009 | Tada et al. |
| 2009/0075157 A1 | 3/2009 | Pak et al. |
| 2009/0081454 A1 | 3/2009 | Axmann et al. |
| 2009/0087371 A1 | 4/2009 | Jang et al. |
| 2009/0087622 A1 | 4/2009 | Busnaina et al. |
| 2009/0101505 A1 | 4/2009 | Marino et al. |
| 2009/0124705 A1 | 5/2009 | Meyer et al. |
| 2009/0134363 A1 | 5/2009 | Bordere et al. |
| 2009/0136413 A1 | 5/2009 | Li et al. |
| 2009/0140215 A1 | 6/2009 | Buchholz et al. |
| 2009/0176100 A1 | 7/2009 | Higashi et al. |
| 2009/0186223 A1 | 7/2009 | Saito et al. |
| 2009/0191352 A1 | 7/2009 | DuFaux et al. |
| 2009/0203519 A1 | 8/2009 | Abatzoglou et al. |
| 2009/0208388 A1 | 8/2009 | McKeigue et al. |
| 2009/0208708 A1 | 8/2009 | Wei et al. |
| 2009/0220392 A1 | 9/2009 | McKeigue et al. |
| 2009/0226704 A1 | 9/2009 | Kauppinen et al. |
| 2009/0246367 A1 | 10/2009 | Houtari et al. |
| 2009/0257945 A1 | 10/2009 | Biris et al. |
| 2009/0286084 A1 | 11/2009 | Tennent et al. |
| 2009/0286675 A1 | 11/2009 | Wei et al. |
| 2009/0291030 A1 | 11/2009 | Edwin et al. |
| 2009/0294753 A1 | 12/2009 | Hauge et al. |
| 2009/0297846 A1 | 12/2009 | Hata et al. |
| 2009/0297847 A1 | 12/2009 | Kim et al. |
| 2009/0301349 A1 | 12/2009 | Afzali-Ardakani et al. |
| 2010/0004468 A1 | 1/2010 | Wong et al. |
| 2010/0009204 A1 | 1/2010 | Noguchi et al. |
| 2010/0028735 A1 | 2/2010 | Basset et al. |
| 2010/0034725 A1 | 2/2010 | Harutyunyan |
| 2010/0047152 A1 | 2/2010 | Whelan et al. |
| 2010/0050639 A1 | 3/2010 | Janus et al. |
| 2010/0062229 A1 | 3/2010 | Hata et al. |
| 2010/0065776 A1 | 3/2010 | Han et al. |
| 2010/0074811 A1 | 3/2010 | McKeigue et al. |
| 2010/0081568 A1 | 4/2010 | Bedworth |
| 2010/0104808 A1 | 4/2010 | Fan et al. |
| 2010/0104849 A1 | 4/2010 | Lashmore et al. |
| 2010/0129654 A1 | 5/2010 | Jiang et al. |
| 2010/0132259 A1 | 6/2010 | Haque |
| 2010/0132883 A1 | 6/2010 | Burke et al. |
| 2010/0150810 A1 | 6/2010 | Yoshida et al. |
| 2010/0158788 A1 | 6/2010 | Kim et al. |
| 2010/0159222 A1 | 6/2010 | Hata et al. |
| 2010/0160155 A1 | 6/2010 | Liang |
| 2010/0167053 A1 | 7/2010 | Sung et al. |
| 2010/0173037 A1 | 7/2010 | Jiang et al. |
| 2010/0173153 A1 | 7/2010 | Hata et al. |
| 2010/0196249 A1 | 8/2010 | Hata et al. |
| 2010/0196600 A1 | 8/2010 | Shibuya et al. |
| 2010/0209696 A1 | 8/2010 | Seals et al. |
| 2010/0210878 A1 | 8/2010 | Naeemi et al. |
| 2010/0213419 A1 | 8/2010 | Jiang et al. |
| 2010/0217059 A1 | 8/2010 | Reyneke et al. |
| 2010/0221173 A1 | 9/2010 | Tennent et al. |
| 2010/0222432 A1 | 9/2010 | Hua |
| 2010/0226848 A1 | 9/2010 | Nakayama et al. |
| 2010/0230642 A1 | 9/2010 | Kim et al. |

(56) References Cited

U.S. PATENT DOCUMENTS

| | | |
|---|---|---|
| 2010/0239489 A1 | 9/2010 | Harutyunyan et al. |
| 2010/0247910 A1* | 9/2010 | Canel ............ C04B 35/58014 |
| | | 264/682 |
| 2010/0254860 A1 | 10/2010 | Shiraki et al. |
| 2010/0254886 A1 | 10/2010 | McElrath et al. |
| 2010/0258446 A1 | 10/2010 | Mohapatra et al. |
| 2010/0260927 A1 | 10/2010 | Gordon et al. |
| 2010/0278717 A1 | 11/2010 | Suzuki et al. |
| 2010/0298125 A1 | 11/2010 | Kim et al. |
| 2010/0301278 A1 | 12/2010 | Hirai et al. |
| 2010/0303675 A1 | 12/2010 | Suekane et al. |
| 2010/0316556 A1 | 12/2010 | Wei et al. |
| 2010/0316562 A1 | 12/2010 | Carruthers et al. |
| 2010/0317790 A1 | 12/2010 | Jang et al. |
| 2010/0320437 A1 | 12/2010 | Gordon et al. |
| 2011/0008617 A1 | 1/2011 | Hata et al. |
| 2011/0014368 A1 | 1/2011 | Vasenkov |
| 2011/0020211 A1 | 1/2011 | Jayatissa |
| 2011/0024697 A1 | 2/2011 | Biris et al. |
| 2011/0027162 A1 | 2/2011 | Steiner, III et al. |
| 2011/0027163 A1 | 2/2011 | Shinohara et al. |
| 2011/0033367 A1 | 2/2011 | Riehl et al. |
| 2011/0039124 A1 | 2/2011 | Ikeuchi et al. |
| 2011/0053020 A1 | 3/2011 | Norton et al. |
| 2011/0053050 A1 | 3/2011 | Urn et al. |
| 2011/0060087 A1 | 3/2011 | Noguchi et al. |
| 2011/0085961 A1 | 4/2011 | Noda et al. |
| 2011/0110842 A1 | 5/2011 | Haddon |
| 2011/0117365 A1 | 5/2011 | Hata et al. |
| 2011/0120138 A1 | 5/2011 | Gaiffi et al. |
| 2011/0142745 A1 | 6/2011 | Feng et al. |
| 2011/0150746 A1 | 6/2011 | Khodadadi |
| 2011/0155964 A1 | 6/2011 | Arnold et al. |
| 2011/0158892 A1 | 6/2011 | Yamaki |
| 2011/0168394 A1 | 7/2011 | Roes et al. |
| 2011/0171109 A1 | 7/2011 | Petrik |
| 2011/0174145 A1 | 7/2011 | Ogrin et al. |
| 2011/0206469 A1 | 8/2011 | Furuyama et al. |
| 2011/0212016 A1 | 9/2011 | Lee et al. |
| 2011/0289924 A1 | 12/2011 | Pietsch |
| 2011/0298071 A9 | 12/2011 | Spencer et al. |
| 2012/0029095 A1 | 2/2012 | Junaedi et al. |
| 2012/0034150 A1 | 2/2012 | Noyes |
| 2012/0034410 A1 | 2/2012 | Baumgart et al. |
| 2012/0080313 A1 | 4/2012 | Baumgart et al. |
| 2012/0083408 A1 | 4/2012 | Sato et al. |
| 2012/0107610 A1 | 5/2012 | Moravsky et al. |
| 2012/0137664 A1 | 6/2012 | Shawabkeh et al. |
| 2012/0148476 A1 | 6/2012 | Hata et al. |
| 2012/0149824 A1 | 6/2012 | Hocke et al. |
| 2012/0234694 A1* | 9/2012 | Vecitis ............... B01D 35/06 |
| | | 204/264 |
| 2012/0258371 A1 | 10/2012 | Nakanishi et al. |
| 2012/0258374 A1 | 10/2012 | Raston et al. |
| 2012/0259026 A1 | 10/2012 | Torres Galvis et al. |
| 2013/0154438 A1 | 6/2013 | Tan |
| 2013/0299415 A1* | 11/2013 | McCutchen ............ C08F 2/32 |
| | | 264/413 |
| 2013/0315813 A1 | 11/2013 | Chang et al. |
| 2014/0021827 A1 | 1/2014 | Noyes |
| 2014/0086820 A1 | 3/2014 | Nakamura et al. |
| 2014/0141248 A1 | 5/2014 | Noyes |
| 2014/0332728 A1* | 11/2014 | Goino ................. C04B 35/645 |
| | | 977/734 |
| 2014/0348739 A1 | 11/2014 | Denton et al. |
| 2015/0059527 A1 | 3/2015 | Noyes |
| 2015/0059571 A1 | 3/2015 | Denton et al. |
| 2015/0064092 A1 | 3/2015 | Noyes |
| 2015/0064096 A1 | 3/2015 | Noyes |
| 2015/0064097 A1 | 3/2015 | Noyes |
| 2015/0071846 A1 | 3/2015 | Noyes |
| 2015/0071848 A1 | 3/2015 | Denton et al. |
| 2015/0078981 A1 | 3/2015 | Noyes |
| 2015/0078982 A1 | 3/2015 | Noyes |
| 2015/0086468 A1 | 3/2015 | Noyes |
| 2015/0093323 A1 | 4/2015 | Koveal, Jr. et al. |
| 2015/0114819 A1 | 4/2015 | Denton et al. |
| 2015/0147259 A1 | 5/2015 | Noyes |
| 2015/0147261 A1 | 5/2015 | Denton et al. |
| 2015/0225242 A1 | 8/2015 | Noyes |
| 2015/0291424 A1 | 10/2015 | Noyes |
| 2015/0321918 A1 | 11/2015 | Noyes |
| 2016/0016794 A1 | 1/2016 | Noyes |
| 2016/0016800 A1 | 1/2016 | Noyes |
| 2016/0016862 A1 | 1/2016 | Noyes |
| 2016/0023902 A1 | 1/2016 | Noyes |
| 2016/0027934 A1 | 1/2016 | Noyes |
| 2016/0030925 A1 | 2/2016 | Noyes |
| 2016/0030926 A1 | 2/2016 | Noyes |
| 2016/0031710 A1 | 2/2016 | Noyes et al. |
| 2016/0039677 A1 | 2/2016 | Noyes |
| 2016/0156051 A1 | 6/2016 | Chua et al. |
| 2017/0036913 A1 | 2/2017 | Noyes |
| 2017/0043310 A1 | 2/2017 | Noyes |
| 2017/0073232 A1 | 3/2017 | Noyes |
| 2017/0174517 A1 | 6/2017 | Noyes |
| 2017/0190578 A1 | 7/2017 | Noyes |
| 2017/0197835 A1 | 7/2017 | Noyes |
| 2017/0334725 A1 | 11/2017 | Noyes et al. |

FOREIGN PATENT DOCUMENTS

| | | |
|---|---|---|
| EP | 0945402 | 9/1999 |
| EP | 1903001 | 3/2008 |
| EP | 2186931 | 5/2010 |
| EP | 2383255 | 11/2011 |
| EP | 2404869 | 1/2012 |
| JP | H1037024 | 2/1998 |
| JP | H11322315 | 11/1999 |
| JP | 2000072981 | 3/2000 |
| JP | 2000264601 | 9/2000 |
| JP | 2001087627 | 4/2001 |
| JP | 2001137691 | 5/2001 |
| JP | 2001187334 | 7/2001 |
| JP | 2002100787 | 4/2002 |
| JP | 2002146634 | 5/2002 |
| JP | 2002201013 | 7/2002 |
| JP | 2002211909 | 7/2002 |
| JP | 3339339 | 10/2002 |
| JP | 2004019018 | 1/2004 |
| JP | 2004517789 | 6/2004 |
| JP | 2004360099 | 12/2004 |
| JP | 2005075725 | 3/2005 |
| JP | 2005081519 | 3/2005 |
| JP | 2005162567 | 6/2005 |
| JP | 2005272277 | 10/2005 |
| JP | 2005532976 | 11/2005 |
| JP | 2006027948 | 2/2006 |
| JP | 2006027949 | 2/2006 |
| JP | 2006152490 | 6/2006 |
| JP | 2007180546 | 7/2007 |
| JP | 2007182352 | 7/2007 |
| JP | 2007191840 | 8/2007 |
| JP | 2010159209 | 7/2010 |
| JP | 4565384 | 10/2010 |
| JP | 2011068509 | 4/2011 |
| JP | 2012524015 | 10/2012 |
| KR | 1020050024674 | 3/2005 |
| KR | 1020050072056 | 7/2005 |
| WO | WO2000017102 A1 | 3/2000 |
| WO | WO200026138 | 5/2000 |
| WO | WO2000032701 | 6/2000 |
| WO | WO20020230816 | 4/2002 |
| WO | WO2003018474 | 3/2003 |
| WO | WO2004007820 | 1/2004 |
| WO | WO2004048263 | 6/2004 |
| WO | WO2004096704 | 11/2004 |
| WO | WO2005103348 | 11/2005 |
| WO | WO2006003482 | 1/2006 |
| WO | WO2006130150 | 12/2006 |
| WO | WO2007047063 | 4/2007 |
| WO | WO2007086909 | 8/2007 |
| WO | WO2007126412 | 11/2007 |
| WO | WO2007139097 | 12/2007 |

(56) References Cited

FOREIGN PATENT DOCUMENTS

| WO | WO2009011984 | 1/2009 |
|---|---|---|
| WO | WO2009122139 | 10/2009 |
| WO | WO2009145959 | 12/2009 |
| WO | WO2010047439 | 4/2010 |
| WO | WO2010087903 | 8/2010 |
| WO | WO2010092787 | 8/2010 |
| WO | WO2010120581 | 10/2010 |
| WO | WO2010124258 | 10/2010 |
| WO | WO2010146169 | 12/2010 |
| WO | WO2011009071 | 1/2011 |
| WO | WO2011020568 | 2/2011 |
| WO | WO2011029144 | 3/2011 |
| WO | WO2011053192 | 5/2011 |
| WO | WO2013032439 | 3/2013 |
| WO | WO2013090274 | 6/2013 |
| WO | WO2013158155 | 10/2013 |
| WO | WO2013158156 | 10/2013 |
| WO | WO2013158157 | 10/2013 |
| WO | WO2013158158 | 10/2013 |
| WO | WO2013158159 | 10/2013 |
| WO | WO2013158160 | 10/2013 |
| WO | WO2013158161 | 10/2013 |
| WO | WO2013158438 | 10/2013 |
| WO | WO2013158439 | 10/2013 |
| WO | WO2013158441 | 10/2013 |
| WO | WO2013162650 | 10/2013 |
| WO | WO2014011206 | 10/2013 |
| WO | WO2014011631 | 1/2014 |
| WO | WO2014151148 | 3/2014 |
| WO | WO2014085378 | 6/2014 |

OTHER PUBLICATIONS

Abatzoglou, Nicolas et al., "The use of catalytic reforming reactions for CO2 sequestration as carbon nanotubes," Proceedings of the 2006 IASMEIWSEAS International Conference on Energy & Environmental Systems, Chalkida, Greece, May 8-10, 2006 (pp. 21-26) (available at: http://www.wseas.us/e-library/conferences/2006evia/papers/516-1 9 3.pdf).

Abney, Morgan B., et al., "The Bosch Process-Performance of a Developmental Reactor and Experimental Evaluation of Alternative Catalysts", NASA Technical Reports Server (NTRS) (Jul. 11, 2010).

Agboola Adedeji E. et al., Conceptual design of carbon nanotube processes, Clean Technologies and Environmental Policy 9.4 (1007): 289-311.

Baddour et al., A simple thermal CVD method for carbon nanotube synthesis on stainless steel 304 without the addition of an external catalyst, 2008, Science Direct, Elsevier pp. 313-318.

Baddour, Carole et al., Direct and repetitive growth cycles of carbon nanotubes on stainless steel particles by chemical vapor deposition in a fluidized bed. Carbon, Mar. 25, 2010, vol. 48, pp. 2652-2656.

Baker, B. A. and G. D. Smith "Metal Dusting in a Laboratory Environment—Alloying Addition Effects," Special Metals Corporation, undated.

Baker, B. A. and G. D. Smith, "Alloy Solutions to Metal Dusting Problems in the PetroChemical Industry," Special Metals Corporation, undated.

Bogue_Powering_Tomorrows_Sensor.

Buckner M. et al., "Automotive CO2 Mitigation Using an Onboard Bosch Reactor: Analysis," Carbon Management Technology Conference (CMTC 2017), (Jul. 17-20, 2017), ISBN: 978-1-5108-4815-3.

Bunnell et al., SAE_911451_Optimization_of_Bosch_Reaction.

Camilli et al., The synthesis and characterization of carbon nanotubes grown by chemical vapor deposition using a stainless steel catalyst, Carbon, 2011, pp. 3307-3315, vol. 49, No. 10.

Cha_Carbon_2008_46_482.

Cheng, H.M. et al., "large-scale and low-cost synthesis of single-walled carbon nanotubes by the catalytic pyrolysis of hydrocarbons," Applied Physics letters 72:3282-3284, Jun. 22, 1998 (available at: http://carbon.imr.ac.cn/file/journai/1998/98_APIJ2_3282-ChengH M.pdf).

Cheung, Chin Li et al., Diameter-controlled synthesis of carbon nanotubes, The Journal of Physical Chemistry B 106.10 (2002): 2429-2433.

Chun, Changmin, and Ramanarayanan, Trikur A., "Metal Dusting Corrosion of Metals and Alloys," 2007.

Chung, U.C., and W.S. Chung, "Mechanism on Growth of Carbon Nanotubes Using CO—H2 Gas Mixture," Materials Science Forum vols. 475-479 (2005) pp. 3551-3554.

Dai, et al., "Single-wall nanotubes produced by metal-catalyzed disproportionation of carbon monoxide," Chemical Physics letters 260 (1996) 471-475, Elsevier.

Dresselhaus et al., Carbon Nanotubes Synthesis, Structure, Properties, and Applications. 2001, pp. 1-9, Springer.

Franks_Carburization_and_Metal_Dusting.

Garmirian, James Edwin, "Carbon Deposition in a Bosch Process Using a Cobalt and Nickel Catalyst," PhD Dissertation, Massachusetts Institute of Technology, Mar. 1980, pp. 14-185.

Grobert, Nicole, "Carbon nanotubes—becoming clean," Materials Today, vol. 10, No. 1-2, Jan.-Feb. 2007, Elsevier, pp. 28-35.

Hata_From_Highly_Efficient_Impurity-Free_CNT_Synthesis_to_DWNT.

Herring_MetalDusting.

Hintze, Paul et al., "Sabatier Subsystem Thermal Management", National Aeronautics and Space Administration (NASA), Aug. 21, 2018.

Hiraoka, Tatsuki, et al., "Synthesis of Single- and Double-Walled Carbon Nanotube Forests on Conducting Metal Foils," 9 J. Am. Chem. Soc. 2006, 128, 13338-13339.

Holmes, et al.; A Carbon Dioxide Reduction Unit Using Bosch Reaction and Expendable Catalyst Cartridges; NASA; 1970; available at https://archive.org/details/nasa_techdoc_1971 0002858.

Huang et al., A review of the large scale production of carbon nanotubes: The practice of nanoscale process engineering. Chinese Science Bulletin, 57(2-3): 157-166. Jan. 2012.

Huang, Z.P., et al., "Growth of highly oriented carbon nanotubes by plasma-enhanced hot filament chemical vapor deposition," Applied Physics Letters 73:3845-3847,Dec. 28, 1998.

INCONELD alloy 693—Excellent Resistance to Metal Dusting and High Temperature Corrosion Special Metals Product Sheet, 2005.

Junaedi, C. et al., Compact and Lightweight Sabatier Reactor for Carbon Dioxide Reduction, AIAA 2011-5033. 41st International Conference on Environmental Systems. Jul. 2011.

Karthikeyan, et al., Large Scale Synthesis of Carbon Nanotubes. E-Journal of Chemistry, 2009, 6(1), 1-12.

Krestinin, A. V., et al. "Kinetics of Growth of Carbon Fibers on an Iron Catalyst in Methane Pyrolysis: A Measurement Procedure with the Use of an Optical Microscope," Kinetics and Catalysis, 2008, vol. 49, No. 1, pp. 68-78.

KUMAR_Srivastava_2019_IOP_Conf._Ser.3A_Mater._Sci._Eng._691_012077.

Lal, Archit, "Effect of Gas Composition and Carbon Activity on the Growth of Carbon Nanotubes," Masters Thesis, University of Florida, 2003.

Lavagna, L. et al., Oxidation of Carbon Nanotubes for Improving the Mechanical and Electrical Properties of Oil-Well Cement-Based Composites, ACS Applied Nano Materials 2022 5 (5), 6671-6678, DOI 10.1021acsanm.2c00706.

Lee, Wen-Chieh, "High Temperature Oxidation and Metal Dusting Resistance of Traditional Iron-based and Novel Alumina Forming Austenitic Alloys" (2017). Theses and Dissertations. 1657. https://dc.uwm.edu/etd/1657.

Mahalingam et al. ,Chemical Methods For Purification of Carbon Nanotubes-A Review / J. Environ. Nanotechnol., 1(1), 53-61, (2012).

Manasse_Schottky_Barrier_Betavoltaic_Battery.

Manning, Michael Patrick, "An Investigation of the Bosch Process," PhD Dissertation, Massachusetts Institute of Technology, Jan. 1976.

(56) References Cited

OTHER PUBLICATIONS

Masarapu et al., Direct Growth of Aligned Multiwalled Carbon Nanotubes on Treated Stainless Steel Substrates. Langmuir, Jun. 9, 2007, vol. 23, pp. 9046-9049.

Matsuoka et al., Iron Removal From Titanium Ore Using Selective Chlorination and Effective Utilization of Chloride Wastes, TMS (The Minerals, Metals & Materials Society), 2005.

Mok, Y.S. et al., "Production of Methane From Carbon Monoxide and Carbon Dioxide in a Plasma-Catalytic Combined Reactor System," Int. J. Sus. Dev. Plann. vol. 8, No. 2 (2013) 186-196.

Monceau, Daniel, et al. "Metal Dusting of Stainless Steels." Materials Science Forum, vol. 251-254, Trans Tech Publications, Ltd., Oct. 1997, pp. 665-670. Crossref, doi:10.4028/www.scientific.net/msf.251-254.665.

Muller-Lorenz et al., Coking by metal dusting of steels, 1999, Materials and Corrosion 50, 614-621 (1999).

Nasibulin, Albert G., et al., "An essential role of $CO_2$ and $H_2O$ during single-walled CNT synthesis from carbon monoxide," Chemical Physics Letters 417 (2005) 179-184.

Nasibulin, Albert G., et al., "Correlation between catalyst particle and single-walled carbon nanotube diameters," Carbon 43 (2005) 2251-2257.

Noordin, Mohamad and Kong Yong Liew, "Synthesis of Alumina Nanofibers and Composites," in Nanofibers, pp. 405-418 (Ashok Kumar, ed., 2010) ISBN 978-953-7619-86-2 (available at http://www.intechopen.com/books/nanofi bers/synthesis-of-alumina-nanofibers-and-composites).

Pender, Mark J., et al., Molecular and polymeric precursors to boron carbide nanofibers, nanocylinders, and nanoporous ceramics, Pure Appl. Chern., vol. 75, No. 9, pp. 1287-1294,2003.

Power-beccs-business-model-consultation.

Rahmen, Daaniya, "Kinetic Modeling of Methanol Synthesis From Carbon Monoxide, Carbon Dioxide, and Hydrogen Over A Cu/ZnO/Cr2O3 Catalyst" (2012). Master's Theses. 4162. DOI: https://doi.org/10.31979/etd.tpdm-4bgg.

Rohani, Aliasgher, et al., "Calcinations of Petroleum coke", 3rd International Conference on Chemical, Ecology and Environmental Sciences (ICEES'2014) Mar. 19-20, 2014 Abu Dhabi (UAE).

Ruckenstein, E. and H.Y. Wang, "Carbon Deposition and Catalytic Deactivation during $CO_2$ Reforming of $CH_4$ over Co/?—Al2O3 Catalysts," Journal of Catalysis, vol. 205, Issue 2, Jan. 25, 2002, pp. 289-293.

Sacco, Albert Jr., "An Investigation of the Reactions of Carbon Dioxide, Carbon Monoxide, Methane, Hydrogen, and Water over Iron, Iron Carbides, and Iron Oxides," PhD Dissertation, Massachusetts Institute of Technology, Jul. 1977, pp. 2,15-234.

Singh_Semiconductor_Devices_Basic_Pricinples.

Singh_Semiconductor_Devices_Introductio_1994.

Skulason, Egill, "Metallic and Semiconducting Properties of Carbon Nanotubes", Modern Physics, CAMP, nanoDTU, Department of Physics, DTU, Nov. 2005.

Songsasen, et al., "Preparation of Carbon Nanotubes by Nickel Catalyzed Decomposition of Liquefied Petroleum Gas (LPG)," Kasetsart J. (Nat. ScL) 35 : 354-359 (2001) http://kasetsartjournal.ku.ac.th/kulfi les/2008/ A0804251023348734.pdf).

Sophonpanich, C, SAE_820875_Utilization_of_Ruthenium_and_Iron_Alloys_as_Bosch_Catalysts.

Sophonpanich, C., "Utilization of Ruthenium and Ruthenium-Iron Alloys as Bosch Process Catalysts," Masters Thesis, Massachusetts Institute of Technology, Dec. 1982.

Srivastava, A. K., et al. Microstructural features and mechanical properties of carbon nanotubes reinforced aluminum-based metal matrix composites. Indian Journal of Engineering and Materials Sciences 15.3 (2008) 247-255.

Szakalos, P. 'Mechanisms of Metal Dusting', PhD dissertation, KTH, Stockholm, 2004.

Szakalos, P., "Mechanisms and driving forces of metal dusting," Materials and Corrosion, 2003, 54, No. 10, pp. 752-762.

Thonpheng, Thermal_and_mechanical_studies_of_carbon.

\* cited by examiner

SOLID CARBON PRODUCTS COMPRISING COMPRESSED CARBON NANOTUBES IN A CONTAINER AND METHODS OF FORMING SAME

PRIORITY CLAIM

This application is a divisional of U.S. patent application Ser. No. 16/320,361, pending, which was filed Jan. 24, 2019, and which was a national phase entry of PCT/US2017/044380, filed Jul. 28, 2017, which in turn claims priority based on U.S. Provisional Patent Application Ser. No. 62/368,061 filed Jul. 28, 2016, and titled "SOLID CARBON PRODUCTS COMPRISING COMPRESSED CARBON NANOTUBES IN A CONTAINER AND METHODS OF FORMING SAME." The entire disclosure of each of these applications is incorporated herein by this reference.

FIELD

Embodiments of the present disclosure relate to methods and systems for forming solid carbon products within a container from carbon nanotubes, including mixtures of various types of nanostructured carbon and mixtures of nanostructured carbon with other substances.

BACKGROUND

Conventional methods of using carbon nanotubes (CNTs) in engineering materials generally rely on embedding the CNTs in a matrix material. CNTs are typically processed in a wide variety of composite structures using metals, plastics, thermoset resins, epoxies, and other substances as the matrix to hold the CNTs together, thus creating solid objects. The CNTs act as reinforcing material to improve properties of the materials. Typical objectives of using CNTs in a matrix are to increase strength, decrease weight, and/or to increase electrical and thermal conductivity of the composite.

Methods of making materials composed primarily of CNTs include spinning the CNTs into fibers and making "buckyrock." U.S. Pat. No. 6,899,945, issued May 31, 2005, and entitled "Entangled Single-Wall Carbon Nanotube Solid Material and Methods for Making Same" discloses a method for making buckyrock. Buckyrock is a three-dimensional, solid block material including an entangled network of single-wall CNTs. Buckyrock is mechanically strong, tough, and impact-resistant. The single-wall CNTs in a buckyrock form a random network. The random network of the CNTs appears to be held in place by van der Waals forces between CNTs and by physical entanglement or interference of the CNTs. One type of buckyrock is made by forming a slurry of CNTs in water, slowly removing water from the slurry to create a paste, and allowing the paste to dry very slowly, such that the CNT network of the paste is preserved during solvent evaporation. Buckyrock can be used in various applications requiring lightweight material with mechanical strength, toughness, and impact resistance, such as ballistic protection systems.

CNTs are typically formed over a metal base, such as platinum. After formation of the body of CNTs, residue from the metal base typically remains in the body of CNTs. The metal base material residue may remain mixed in the body of the CNTs or may alternatively be washed out after forming the body of CNTs. The washing may be done by any one of several methods known in the art, such as acid washing.

Materials composed primarily of CNTs can be formed by pressure compaction methods, such as extruding, die pressing, roller pressing, injection molding, etc., to form solid shapes of a plurality of CNTs, as disclosed in U.S. Patent Publication 2015/0225242, "Solid Carbon Products Comprising Carbon Nanotubes and Methods of Forming Same," published Aug. 13, 2015, the entire disclosure of which is incorporated herein by this reference. The CNTs may optionally be mixed with other substances. Such solid shapes may be further processed by heating to temperatures sufficient to sinter at least some of the CNTs and form covalent bonds between adjacent CNTs. The methods may include forming a plurality of CNTs, disposing the CNTs in a press, and applying heat and pressure to the CNTs to form the solid carbon product. When sintered, the resulting material is a composition of matter having two or more CNTs with covalent bonding between them.

Additional methods for the production of solid carbon products are disclosed in U.S. Patent Publication 2012/0034150, "Method for Producing Solid Carbon by Reducing Carbon Oxides," published on Feb. 9, 2012, the entire disclosure of which is incorporated herein by this reference. Solid carbon products may be produced by reducing carbon oxides with a reducing agent in the presence of a catalyst. The carbon oxides are typically either carbon monoxide, carbon dioxide, or a mixture thereof. The reducing agent is typically either a hydrocarbon gas or hydrogen. The desired morphology of the solid carbon product may be controlled by the specific catalysts, reaction conditions, and optional additives used in the reduction reaction. The resulting solid carbon products have many commercial applications.

Solid carbon products are useful in filter applications. Activated carbon, typically derived from charcoal, is currently used in a variety of filter applications, such as filtering water, removing pathogens and other bacteria, and distilling petroleum products.

DISCLOSURE

Methods of forming solid carbon filter products within a container include compressing particles of nanostructured carbon (e.g., CNTs, carbon nanofibers, etc.) within a container to form a compressed mass of nanostructured carbon within a container. The nanostructured carbon may optionally be mixed with other substances. The nanostructured carbon within the container may be further processed by heating to temperatures sufficient to sinter at least some of the nanostructured carbon so that covalent bonds form between adjacent particles of nanostructured carbon. The methods may include forming nanostructured carbon, disposing the nanostructured carbon in a container, disposing the container in a press, and applying pressure and/or heat to the container and the nanostructured carbon within the container to form the solid carbon product in the container. When sintered, the resulting material includes two or more particles of the nanostructured carbon with covalent bonding between them.

The solid carbon products, whether sintered or not, comprise interlocked particles that define a plurality of voids throughout the solid carbon product. Dimensions of the interstitial voids may be controlled by a variety of methods including controlling the characteristic dimensions (e.g., diameter, length, wall thickness, etc.) of the nanostructured carbon, the inclusion of other materials that create voids when removed from the nanostructured carbon, and the pressures and temperatures at which the nanostructured carbon is formed.

Sintered solid carbon products include a plurality of covalently bonded particles of nanostructured carbon. Some methods include compressing a material including nanostructured carbon within a container, heating the compressed material in a non-reactive environment to form chemical bonds between adjacent particles of nanostructured carbon and thereby form a bonded structure, and cooling the bonded structure to a temperature at which the nanostructured carbon does not react with oxygen.

Other methods include first forming a solid carbon product by compressing a container having an enclosure wall with nanostructured carbon disposed within a volume or void defined by the enclosure wall. The resulting solid carbon product is subsequently subjected to sintering conditions. The sintering conditions may include an inert environment, such as a vacuum or inert atmosphere (e.g., argon, helium, or nitrogen). The solid carbon product is heated to a selected temperature for a period of time to induce covalent bonding between adjacent particles of nanostructured carbon, after which the solid carbon product is cooled below the oxidation temperature of carbon in air. The product may then be removed from the sintering conditions.

Sintering of the solid carbon products can be performed in a variety of apparatuses such as are commonly used in sintered powder metallurgy and sintered ceramic processing. The sintering of the solid carbon products may include heating means, including induction heating, plasma arc discharge, high temperature autoclaves and annealing furnaces, and other related devices and methods.

This disclosure includes methods of forming solid carbon products within a container by applying pressure to nanostructured carbon within a container and/or by applying pressure to the container. Solid carbon products formed within a container may be useful in various applications, such as filters. Such solid carbon products may exhibit enhanced properties (e.g., strength, electrical or thermal conductivity, specific surface area, porosity, etc.) with respect to conventional materials. Nanostructured carbon within a container is compressed within the container and the container may be simultaneously compressed. The nanostructured carbon within the container may be formed into a filter by fastening a lid onto the container.

MODE(S) FOR CARRYING OUT THE INVENTION

Figure 1:
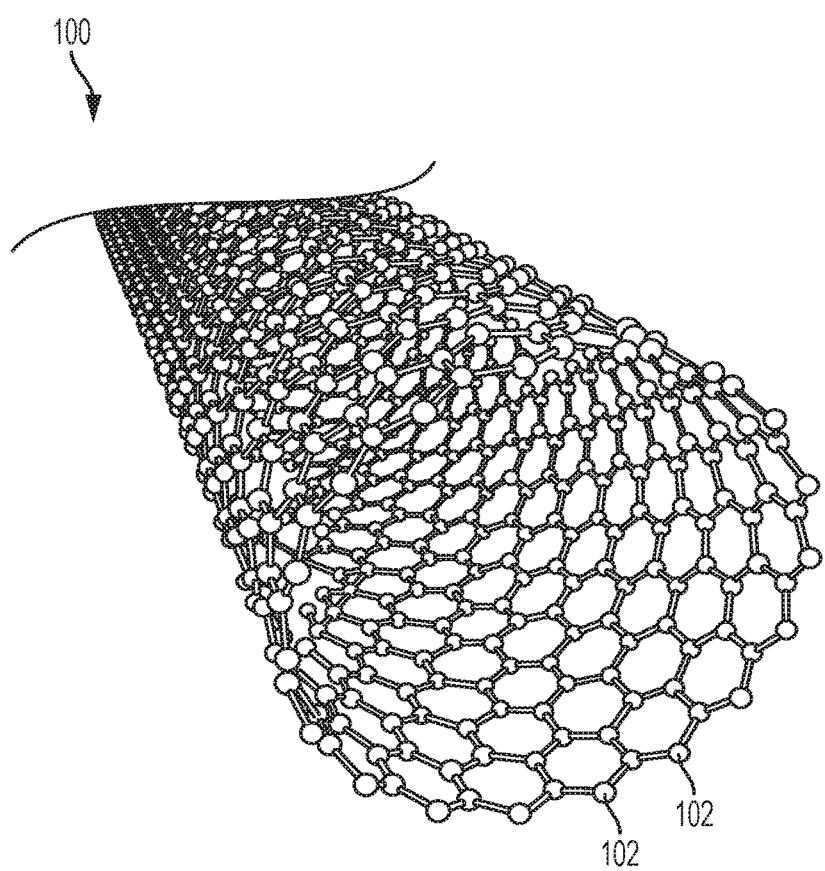
FIGS. 1-4 are simplified illustrations of CNTs.

This disclosure describes methods of forming solid carbon products by applying pressure to CNTs and other forms of nanostructured carbon within a container, and methods for applying heat to the solid products formed by such processes. Solid carbon products may be useful in various filtering applications. Such solid carbon products may exhibit enhanced properties (e.g., strength, electrical or thermal conductivity, specific surface area, porosity, etc.) with respect to conventional materials. In some embodiments, solid carbon products contain a compressed nanostructured carbon within a container. When such masses are sintered, covalent bonds form between at least some of the carbon particles, forming solid shapes. This product has numerous useful filter applications. For example, some forms of nanostructured carbon that may benefit from such processes include graphene, fibrous carbon, buckminsterfullerenes, single-wall CNTs, multi-wall CNTs, or bimodal CNTs (i.e., CNTs having a bimodal distribution of diameters and/or a bimodal distribution of lengths). Nanostructured carbon may have any selected size and morphology, even helical.

As used herein, the term "sintering" means and includes annealing or pyrolyzing nanostructured carbon at temperatures and pressures sufficient to induce carbon-carbon covalent bonding between at least some of the adjacent particles between at least some of their contact points.

As used herein, the term "catalyst residual" means and includes any non-carbon elements associated with the nanostructured carbon. Such non-carbon elements may include, for example, nanoparticles of metal catalyst in growth tips of CNTs, and metal atoms or groups of atoms randomly or otherwise distributed throughout and on the surfaces of the nanostructured carbon.

As used herein, the term "green" means and includes any solid carbon product that has not been sintered.

Nanostructured carbon may be formed through any method known to the art, including arc discharge, laser ablation, hydrocarbon pyrolysis, the Boudouard reaction, the Bosch reaction and related carbon oxide reduction reactions, or wet chemistry methods (e.g., the Diels-Alder reaction). The methods described herein are applicable to nanostructured carbon regardless of the method of manufacture or synthesis.

CNTs occur as single-wall and multi-wall CNTs of various diameters ranging from a few nanometers to 100 nanometers in diameter or more. CNTs have a wide variety of lengths and morphologies, and may occur as substantially parallel "forests," randomly tangled masses, or "pillows" of structured agglomerations. For example, CNTs may be formed as described in U.S. Patent Publication 2015/0064092, "Methods and Reactors for Producing Solid Carbon Nanotubes, Solid Carbon Clusters, and Forests," published Mar. 5, 2015, the entire disclosure of which is incorporated herein by this reference. CNTs may also form or be compounded to form many different mixtures of CNTs with various combinations and distribution of the above characteristics (number of walls, diameters, lengths, morphology, orientation, etc.). Various mixtures, when compounded and used to form the solid carbon products described herein, may result in products with specifically engineered properties. For example, the median void size of interstitial spaces between CNTs comprising solid carbon products typically is approximately proportional to the characteristic diameters of the CNTs used in forming the solid carbon products. The median void size influences the overall porosity and density of the solid carbon products.

Various CNT features and configurations are illustrated in FIGS. 1-4. FIG. 1 shows a single-wall CNT 100, in which carbon atoms 102 are linked together in the shape of a single cylinder. The carbon atoms 102 are covalently bonded into a hexagonal lattice, and thus form a CNT 100 that appears as a single graphitic layer rolled into the form of a tube. The CNT 100 may be conceptualized as a "rolled graphene sheet" with a lattice pattern oriented so that the carbon atoms 102 spiral at various angles with regard to the axis of the CNT 100. The angle is called the "chirality," and common named forms include armchair and zigzag, as described in Mildred S. Dresselhaus & Phaedon Avouris, Introduction to Carbon Materials Research, in Carbon Nanotubes: Synthesis, Structure, Properties, and Applications, 1, 6 (Dresselhaus, et al., eds., 2001), the entire disclosure of which is incorporated herein by this reference. Many chiralities are possible; CNTs 100 with different chiralities exhibit different properties (e.g., different CNTs 100 may have semiconductor or metallic electrical properties).

The CNT 100 has an inside diameter related to the number of carbon atoms 102 in a circumferential cross section. The CNT 100 depicted in FIG. 1 has a zigzag pattern, as shown at the end of the CNT 100. The diameter may also affect properties of the CNT 100. Single-walled CNTs 100 can have many different diameters, such as from approximately 1.0 nm (nanometer) to 10 nm or more. A CNT 100 may have a length from about 10 nm to about 1 μm (micron), such as from about 20 nm to about 500 nm or from about 50 nm to about 100 nm. CNTs 100 typically have an aspect ratio (i.e., a ratio of the length of the CNT to the diameter of the CNT) of about 100:1 to 1000:1 or greater.

Figure 2:
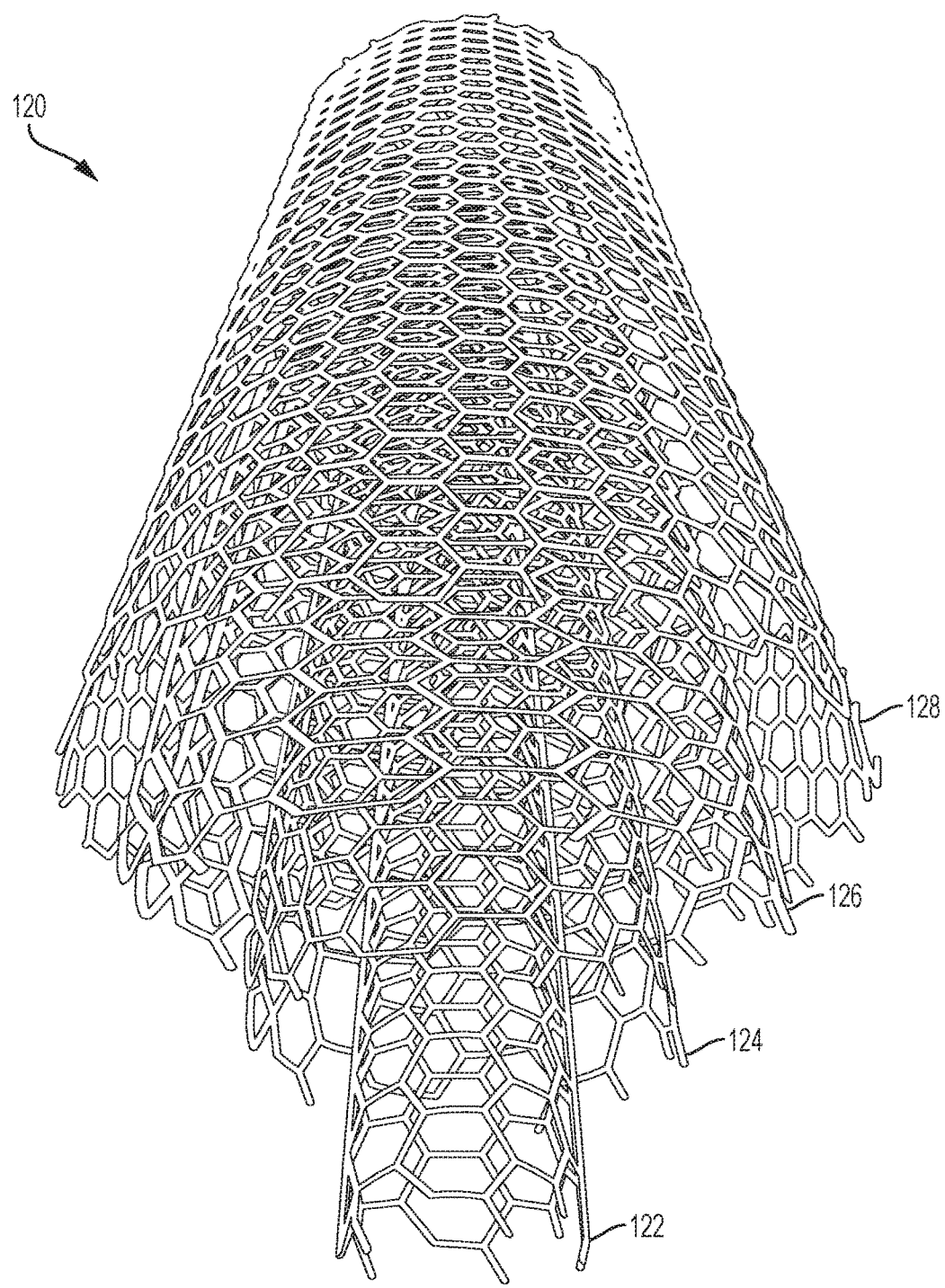

CNTs having more than one wall are called multi-wall CNTs. FIG. 2 schematically depicts a multi-wall CNT 120 having multiple graphitic layers 122, 124, 126, 128 arranged generally concentrically about a common axis. Double-walled and triple-walled CNTs are occasionally described as distinct classes; however, they may be considered as the smallest categories of multi-walled CNTs 120. Diameters of multi-wall CNTs 120 can range from approximately 3 nm to well over 100 nm. Multi-wall CNTs 120 having outside diameters of about 40 nm or more are sometimes referred to as carbon nanofibers.

Figure 3:
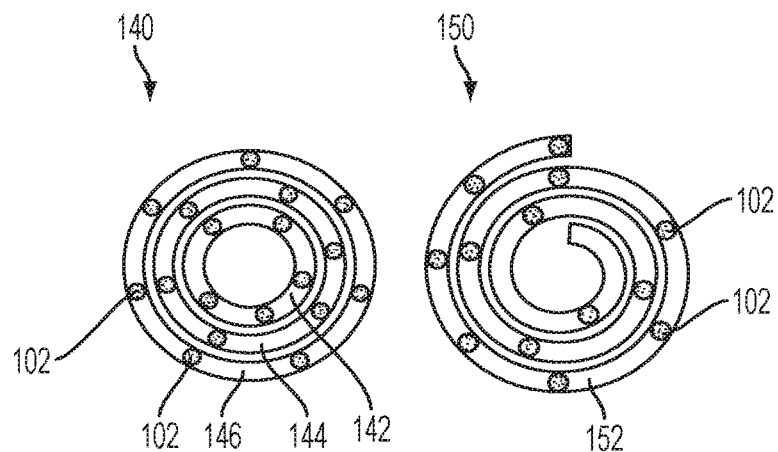

FIG. 3 depicts two forms of multi-wall CNTs 140, 150. In the CNT 140, one single-wall CNT 142 is within a larger diameter singe-wall CNT 144, which may in turn be within another even larger diameter single-wall CNT 146. This CNT 140 is similar to the CNT 120 shown in FIG. 2, but includes three single-wall CNTs 142, 144, 146 instead of four. Another form of multi-wall CNTs is shown in FIG. 3 as CNT 150, which may be conceptualized as a single graphene sheet 152 rolled into a spiral.

Figure 4:
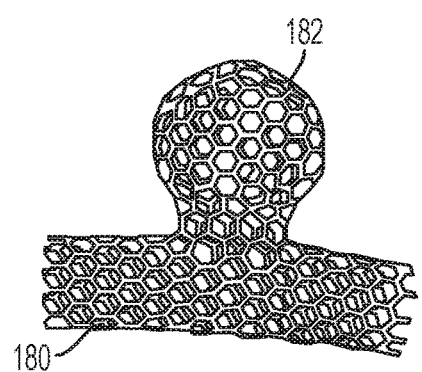

FIG. 4 schematically depicts a single-wall CNT 180 with an attached nanobud 182. The nanobud 182 has a structure similar to a spherical buckminsterfullerene ("buckyball"), and is bonded to the single-wall CNT 180 by carbon-carbon bonds. As suggested by the structure shown in FIG. 4, modifications may be made to the wall of a single-wall CNT 180 or to the outer wall of a multi-wall CNT. At the point of bonding between the nanobud 182 and the CNT 180, carbon double bonds can break and result in "holes" in the wall of the CNT 180. These holes may affect the mechanical and electrical properties of the CNT 180. In single-wall CNTs, these holes may introduce a relative weakness when compared to unmodified cylindrical CNTs. In multi-wall CNTs, the outer wall may be affected, but inner walls may remain intact.

CNTs are typically formed in such a way that a nanoparticle of catalyst material is embedded in the growth tip of the CNT. This catalyst material may be left in place or removed by mild washing (e.g., by an acid wash). Without being bound to a particular theory, it is believed that if the catalyst material is left in place, catalyst atoms become mobilized during the sintering process, and may migrate to the surface or within the pores of the CNTs. This process may disperse the catalyst atoms randomly, uniformly, or otherwise throughout the solid carbon product mass and may have a significant influence on the properties of the solid carbon product. For example, catalyst material may affect electrical conductivity or the ability to catalyze other chemical reactions.

The catalyst particles may be selected to catalyze other reactions in addition to the formation of solid carbon. Catalyst particles may be any material, such as a transition metal or any compound or alloy thereof. Typical catalysts include metals selected from groups 2 through 15 of the periodic table, such as from groups 5 through 10 (e.g., nickel, molybdenum, chromium, cobalt, tungsten, manganese, ruthenium, platinum, iridium, etc.), actinides, lanthanides, alloys thereof, and combinations thereof. Note that the periodic table may have various group numbering systems. As used herein, group 2 is the group including Be, group 3 is the group including Sc, group 4 is the group including Ti, group 5 is the group including V, group 6 is the group including Cr, group 7 is the group including Mn, group 8 is the group including Fe, group 9 is the group including Co, group 10 is the group including Ni, group 11 is the group including Cu, group 12 is the group including Zn, group 13 is the group including B, group 14 is the group including C, and group 15 is the group including N. For example, catalyst particles may include nickel, vanadium oxide, palladium, platinum, gold, ruthenium, rhodium, iridium, etc.

Because the catalyst particles are attached to or otherwise associated with CNTs, each catalyst particle may be physically separated from other catalyst particles. Thus, the catalyst particles may collectively have a much higher surface area than a bulk material having the same mass of catalyst. Catalyst particles attached to CNTs may therefore be particularly beneficial for decreasing the amount of catalyst material needed to catalyze a reaction and for reducing the cost of catalysts. Compressed solid carbon products used as catalysts may, in many applications, benefit from the catalytic activity of both the CNT and the metal catalyst particles embedded in the growth tip of the CNTs.

The CNTs used in the processes herein may be single-wall CNTs, multi-wall CNTs, or combinations thereof, including bi-modally sized combinations of CNTs, mixtures of single-wall and multi-wall CNTs, mixtures of various sizes of single-wall CNTs, mixtures of various sizes of multi-wall CNTs, etc. For example, CNTs may have a bi-modal distribution, as described in U.S. Patent Publication 2015/0064097, "Carbon Nanotubes Having a Bimodal Size Distribution," published Mar. 5, 2015, the entire disclosure of which is incorporated herein by this reference. The CNTs may be in forms such as a sheet-molded compound, a pressure-molded compound, or as a pourable liquid.

Figure 5:
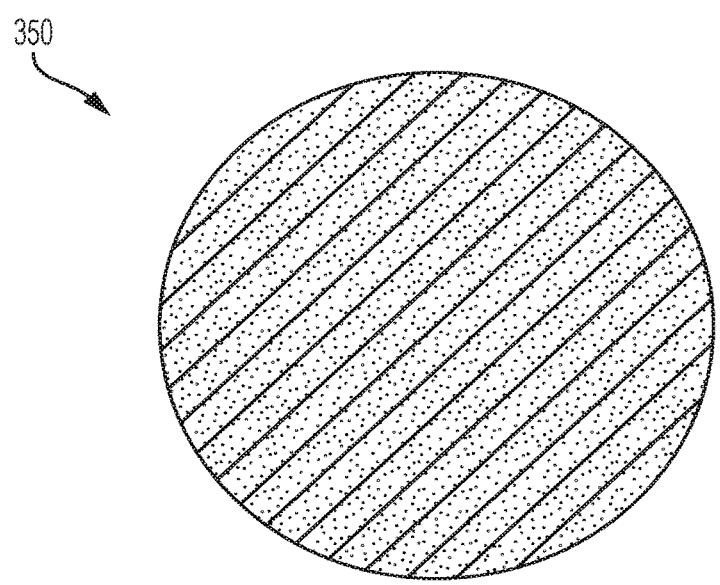
FIG. 5 is a simplified cross-sectional illustration of a carbon nanofiber.

FIG. 5 schematically illustrates a cross section of a carbon nanofiber 350 in accordance with embodiments of the disclosure. As used herein, the term "carbon nanofiber" means and includes a carbon-containing material comprising a solid generally cylindrical shape substantially free of any voids (e.g., without a hollow central portion). A carbon nanofiber may be similar to a CNT, but may include a solid core rather than a hollow central portion. Carbon nanofibers may exhibit a rod-like shape and may exhibit a greater density than CNTs. In some embodiments, carbon nanofibers may exhibit a greater density than CNTs having the same diameter. Carbon nanofibers may also be in the form of stacked graphene sheets. Carbon nanofibers may be formed through any method known in the art, including deposition from carbon vapor, such as by catalytic chemical vapor deposition (CCVD) wherein carbon is deposited in the presence of a transition metal catalyst on a substrate, or other method of forming carbon nanofibers known in the art.

Figure 6:
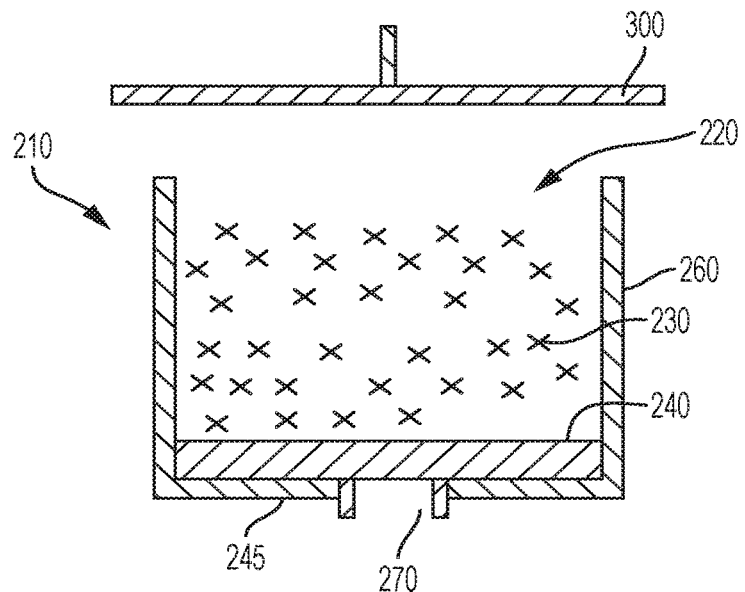
FIGS. 6-8 are simplified cross-sectional views depicting filter structures and portions thereof in one method for forming a filter comprising compressed nanostructured carbon.
Figure 7:
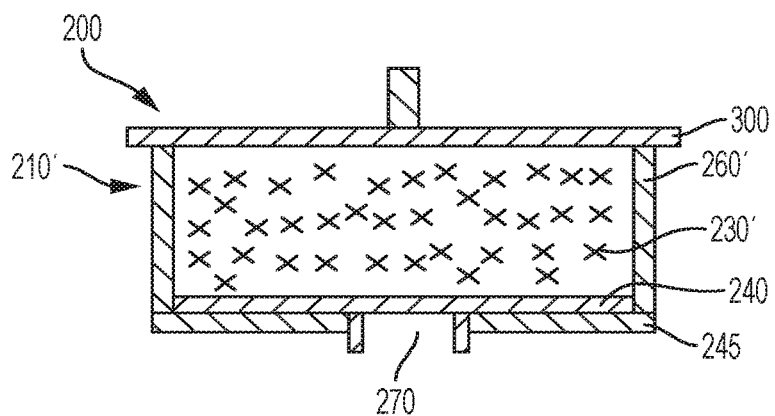
Figure 8:
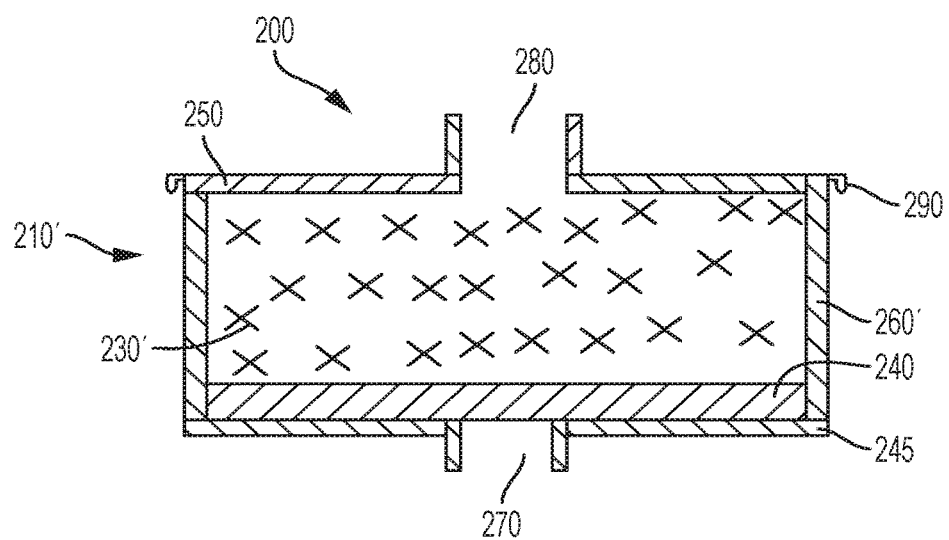

FIGS. 6-8 illustrate a method of forming a filter structure 200 (shown in FIG. 8). FIG. 6 illustrates a container 210 having side walls 260, an end wall 245, and a diffuser plate 240 that together define a volume 220 within the container 210. The container 210 may be sized and configured to receive a mass of uncompressed nanostructured carbon 230, such that the volume 220 is substantially filled with a mass of uncompressed nanostructured carbon 230.

The nanostructured carbon 230 may optionally be sintered. Sintering appears to cause covalent bonds to form between particles of nanostructured carbon at contact points. That is, any given particle may "cross-link" with an adjacent particle at the physical point of contact of the two particles. A sintered particle may be covalently bound to numerous other particles (single-wall CNTs, multi-wall CNTs, CNTs with attached nanobuds, carbon nanofibers, graphene sheets, etc.). This may increase the strength of the resulting structure because the particles do not appear to slide or slip at the bonding points. Unsintered particles (e.g., in buckyrock) appear to slide with respect to each other. Because the covalent bonding caused by sintering may occur at numerous sites in the nanostructured carbon, the sintered body may have significantly increased strength, toughness, impact resistance, and conductivity over conventional agglomerations of nanostructured carbon. A sintered mass of nanostructured carbon may have the bond strength necessary to resist the mechanical force of a gas or fluid passing through the mass of nanostructured carbon.

As a non-limiting example, the side walls 260 and the end wall 245 of the container 210 may include a material such as metal, plastic, ceramic, paper, cloth, a composite, or any combination thereof. For example, the side walls 260 and the end wall 245 of the container 210 may include a metal such as aluminum or steel. Alternatively, the side walls 260 and the end wall 245 may include a ceramic or a composite material. In certain applications, side walls 260 and end wall 245 may include a plastic material, such as polycarbonate, or a paper or paper-like material, such as cardboard.

As a non-limiting example, side walls 260 of the container 210 may be configured to be compressed when a piston 300 presses the nanostructured carbon 230 (e.g., the side walls 260 may have an outside dimension smaller than an outside dimension of the piston). Alternatively, side walls 260 of the container 210 may be configured to not be compressed when a piston presses the nanostructured carbon 230 (e.g., the side walls 260 may have an outside dimension larger than an outside dimension of the piston). In the embodiment shown in FIGS. 6-8, the side walls 260 of the filter structure 200 are configured to be compressed.

The container 210 may be formed in any suitable shape, depending on the configuration and the application of filter structure 200. As a non-limiting example, a cross-section of the container 210 from a top-view may be a circle, an ellipse, a rectangle, a triangle, or another polygon. Furthermore, the container 210 may have any appropriate dimensions for a given application, including height and thickness of side walls 260 and dimensions of the top-view cross-section of the container 210. As a non-limiting example, side walls 260 may have a height of between about 1 cm to 50 cm, and side walls 260 may have a thickness of about 10 μm to 1 mm.

The end wall 245 of the container 210 may also define an opening 270. During use of a filter structure 200, the opening 270 may be connected to a gas and/or fluid source, allowing gases and/or fluids to pass into the container 210. As a non-limiting example, the opening 270 may have any appropriate cross-sectional shape, such as a circle, ellipse, rectangle, or triangle. Furthermore, the opening 270 may have any appropriate cross-sectional dimensions. The opening 270 may be configured to be coupled to an exterior system from which gases or other fluids flow to the filter structure 200. The opening 270 may be connected to the gas and/or fluid source by a hose, a threaded pipe fitting, a weldable pipe fitting, or a nipple fitting.

The diffuser plate 240 may be a substantially porous material that allows gases compressed during compression of the nanostructured carbon 230 to pass through the nanostructured carbon 230 and exit through the opening 270, allowing compression of the nanostructured carbon 230 without a pressure build-up from the gases. The diffuser plate 240 may also be used to diffuse the gases and liquids that enter through opening 270 during a subsequent filtering process, such that the gases or fluids flow in an evenly distributed pattern over the cross-sectional area of the nanostructured carbon 230' (shown in FIG. 8). As a non-limiting example, the diffuser plate 240 may be sized and configured to fit within the container 210. As a further non-limiting example, the diffuser plate 240 may include at least one of a metal, a plastic, and a composite material. As a further non-limiting example, the diffuser plate 240 may have a thickness of between about 0.1 mm to 2 mm.

FIG. 6 shows a piston 300 sized and configured to compress the compressible sidewall 260 and the nanostructured carbon 230 within the container 210. The piston 300 may be driven by hydraulic pressure, pneumatic pressure, a motor, or any other suitable means. The face of the piston 300 may include a non-porous material in order to achieve maximum compression of the nanostructured carbon 230.

The container 210 may be placed within an appropriate compression apparatus and may be sized and configured to receive the piston 300. The container 210 may include side walls 260 which are compressible by a compressive force exerted by the piston 300. FIG. 7 illustrates the piston 300 compressing the side walls 260 and the nanostructured carbon 230 to form a compressed container 210' having compressed side walls 260' and compressed nanostructured carbon 230' therein. After compression, the piston 300 is retracted, and the compressed side walls 260' may remain in a compressed state. Alternatively, in some embodiments, the interior of the side walls 260 may be sized and configured such that the piston 300 fits within the interior of the side walls 260 and compresses only the nanostructured carbon without compressing the side walls 260.

The diffuser plate 240 may prevent the nanostructured carbon 230 from exiting the container 210 upon compression by the piston 300. In subsequent use, fluids and/or gases may pass through the diffuser plate 240 to the compressed nanostructured carbon 230', the compressed nanostructured carbon 230' acting as a filter.

The piston 300 may compress the nanostructured carbon 230 in an inert atmosphere. The inert atmosphere under which compression takes place may include an atmosphere of $N_2$. The piston 300 may compress the nanostructured carbon 230 at a temperature of between about 1,500° C. and 2,000° C. The piston 300 may remain in compression for a time period from about 1 to about 600 seconds, such as approximately 30 seconds. The piston 300 may compress the nanostructured carbon 230 into a substantially unitary form using a pressure of between about 10 MPa to about 1,000 MPa.

FIG. 8 shows the compressed nanostructured carbon 230' in the compressed container 210'. The compressed container 210' includes the compressed side walls 260', the end wall 245, and the diffuser plate 240 (which may or may not have become thinner when the nanostructured carbon 230 was compressed). The container 210' contains the compressed nanostructured carbon 230'. A lid 250 may be secured to the compressed side wall 260' using a fastener 290 (e.g., a threaded ring, a crimp, an adhesive, a weld, etc.). In other embodiments, the lid 250 may be secured by a press or interference fit, or by any other appropriate fastening means. The lid 250 may further include an outlet opening 280. The outlet 280 may be configured to be coupled to an exterior system to which gases or other fluids flow from the filter structure 200. The outlet 280 may be connected to the exterior system by a hose, a threaded pipe fitting, a weldable pipe fitting, or a nipple fitting.

The compressed nanostructured carbon 230' within the filter structure 200 may substantially fill the compressed container 210'. The compressed nanostructured carbon 230' within the container 210' may be in substantial contact with the diffuser plate 240 and the side walls 260'. The diffuser plate 240 and the side walls 260' may exert a compressive stress on the compressed nanostructured carbon 230' after compression. The end wall 245 may define at least one inlet opening 270. The inlet opening 270 may be in fluid communication with the nanostructured carbon 230' (i.e., a fluid passing through the inlet opening 270 may pass into the nanostructured carbon 230'. Though referred to herein as an inlet opening 270 and an outlet opening 280, the inlet opening 270 may be used as an outlet and the outlet opening 280 may be used as an inlet.

The end wall 245 may include a porous material or a non-porous malleable material, as discussed herein.

As discussed previously, the compressed nanostructured carbon 230' may include single-walled CNTs (SWCNTs), multi-walled CNTs (MWCNTs), carbon nanofibers, graphene, etc. As a non-limiting example, the compressed nanostructured carbon 230' may include only SWCNTs. Alternatively, the compressed nanostructured carbon 230' may include only MWCNTs or only carbon nanfibers. Alternatively, the compressed nanostructured carbon 230' may include a mixture of SWCNTs, MWCNTs, and carbon nanofibers. The compressed nanostructured carbon 230' may be sintered or unsintered depending on the filter application.

The compressed nanostructured carbon 230' may have a bulk density suitable for a selected filter application. As a non-limiting example, the compressed nanostructured carbon 230' may have a bulk density of from about 0.8 g/cm$^3$ to about 2.2 g/cm$^3$.

The compressed nanostructured carbon 230' within the compressed container 210' may have attached chemical moieties. The chemical moieties may include, for example, whole functional groups or parts of functional groups as substructures. The chemical moieties may include alkyl groups, carbonyl groups, aromatics, non-aromatic rings, peptides, amino groups, hydroxyl groups, sulfate groups, phosphate groups, etc.

The compressed nanostructured carbon 230' may be an interbonded mass of nanostructured carbon, having multiple bonds that interconnect particles directly to other particles. The compressed nanostructured carbon 230' may alternatively be bonded via a resin or a polymer adhesive. For example, such materials may be applied using chemical vapor deposition (CVD) or similar means in a micro-fine manner so as to provide interlocking bonding without encasing the compressed nanostructured carbon 230' in droplets of resin. CVD techniques may be used to apply micro-thin layers of metals bonding particles together without interfering with the compressibility of the compressed nanostructured carbon 230'. Metals such as tin, copper and the like may be applied by CVD or similar techniques.

Further embodiments are contemplated wherein a filter structure does not include a separate end wall, having only an enclosure wall comprising a porous diffuser plate. In such embodiments, the filter structure may be configured to interface directly with an exterior system such that gas or other fluids would pass from the exterior system directly to the enclosure wall comprising a porous diffuser plate. The filter structure may be connected to the gas and/or fluid source by a hose, a threaded pipe fitting, a weldable pipe fitting, or a nipple fitting.

Figure 9:
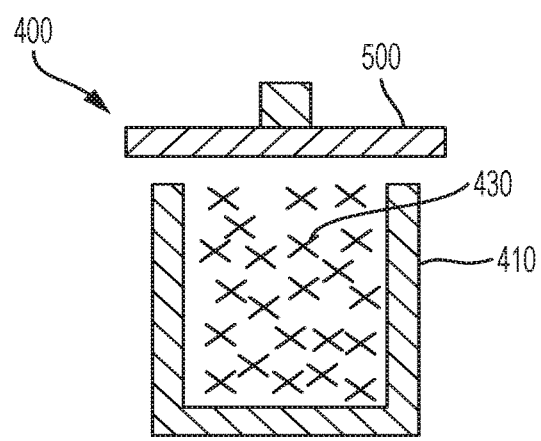
FIGS. 9-12 are simplified cross-sectional views depicting structures used in another method for forming a filter comprising compressed nanostructured carbon.

FIGS. 9-12 illustrate another embodiment of a method of compressing nanostructured carbon within a container. FIG. 9 shows a container 400 having porous walls 410 and a mass of uncompressed nanostructured carbon 430 within the container 400. The nanostructured carbon 430 may be optionally sintered, as described above. The porous sidewall material may include, for example, a metal, plastic, paper, fabric, or composite.

Figure 10:
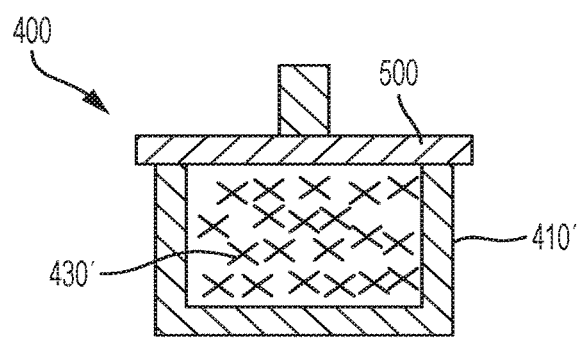
Figure 11:
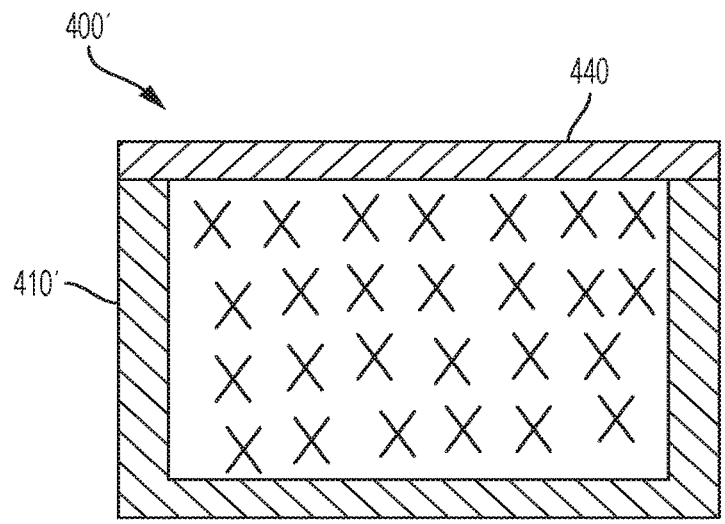

A piston 500 may be configured to compress the container 400 having walls 410 with the nanostructured carbon 430 therein, as described above, to yield a compressed container 400' having compressed walls 410' with compressed nanostructured carbon 430' therein (FIG. 10). As shown in FIG. 11, a lid 440 may be fastened to at least one of the compressed walls 410'. The lid 440 may be fastened by crimping, applying adhesive, threading, welding, press or interference fitting, or another appropriate method, as described above.

Figure 12:
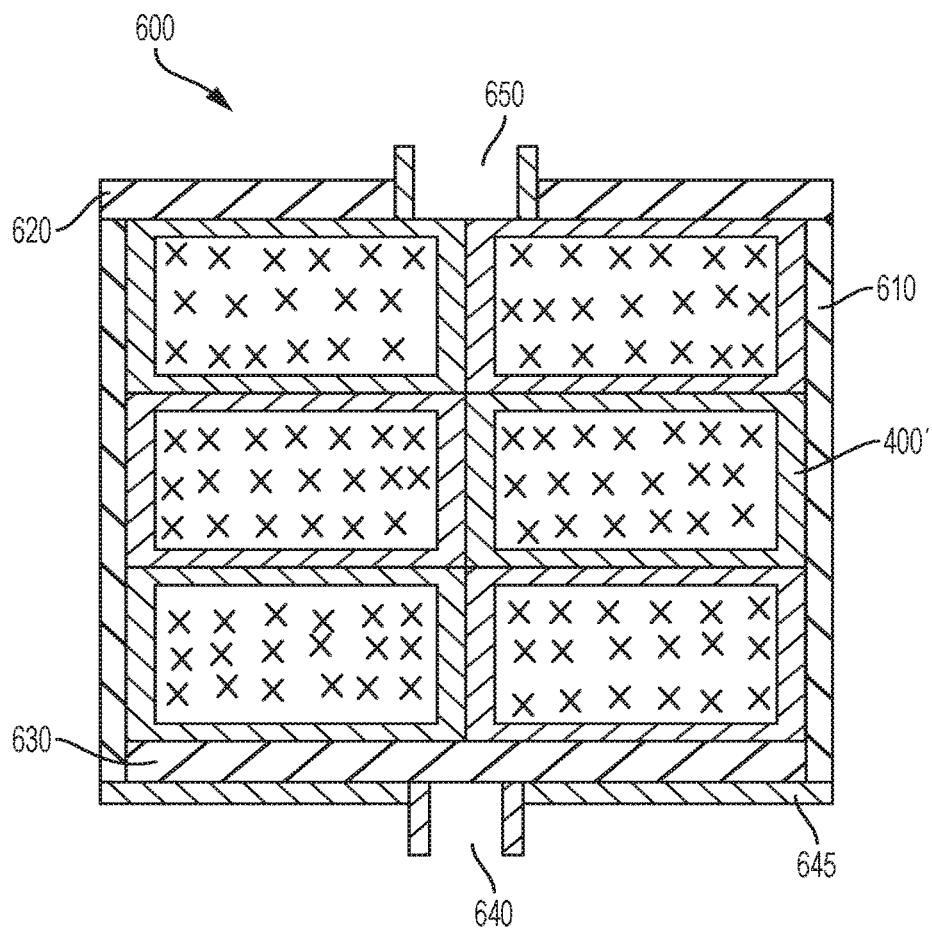

One or more of the compressed containers 400' may be placed in a filter device 600, as shown in FIG. 12. The filter device 600 may include one or more side walls 610, an end wall 645, a porous diffuser plate 630, an inlet 640, a lid 620 defining an outlet 650 therein, and filter modules 400'. The filter modules 400' may be configured to filter fluids or gases that pass through the filter device 600. The physical characteristics of the filter device 600 may be similar to those described above with respect to other embodiments. The porous diffuser plate 630 direct the fluids and/or gases passing through the filter device 600.

Figure 13:
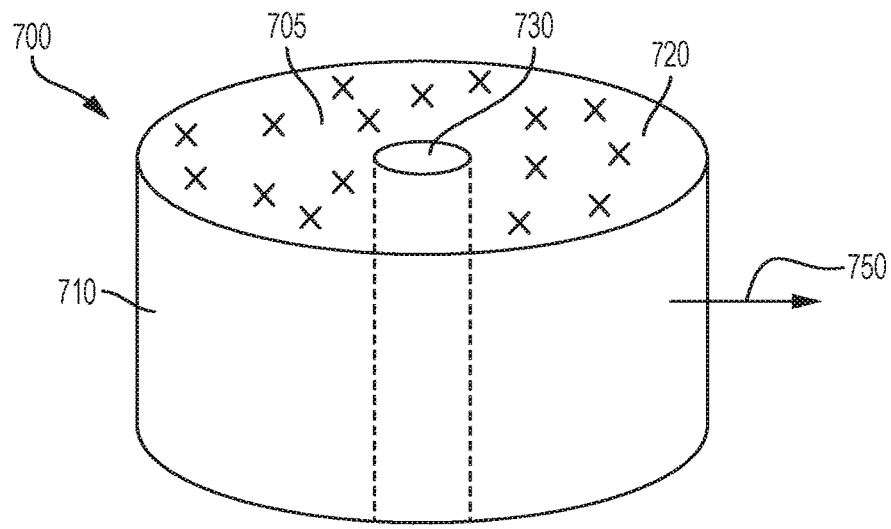
FIGS. 13-17 are illustrations of additional embodiments of filters comprising compressed nanostructured carbon within different containers.

FIG. 13 illustrates a cylindrical filter structure 700 including a porous container 705 having porous paper or paper-based sidewalls 710. The porous container 705 includes compressed nanostructured carbon 720 within the sidewalls 710. The filter structure 700 defines a cylindrical opening 730. In this embodiment, a fluid or gas flows into opening 730. The fluid then flows radially outward through the compressed nanostructured carbon 720 within the porous container 705 from the opening 730, in the direction shown by arrow 750. The filter structure 700 has many applications and may be used, for example, as an oil filter or air filter for an internal combustion engine.

Figure 14:
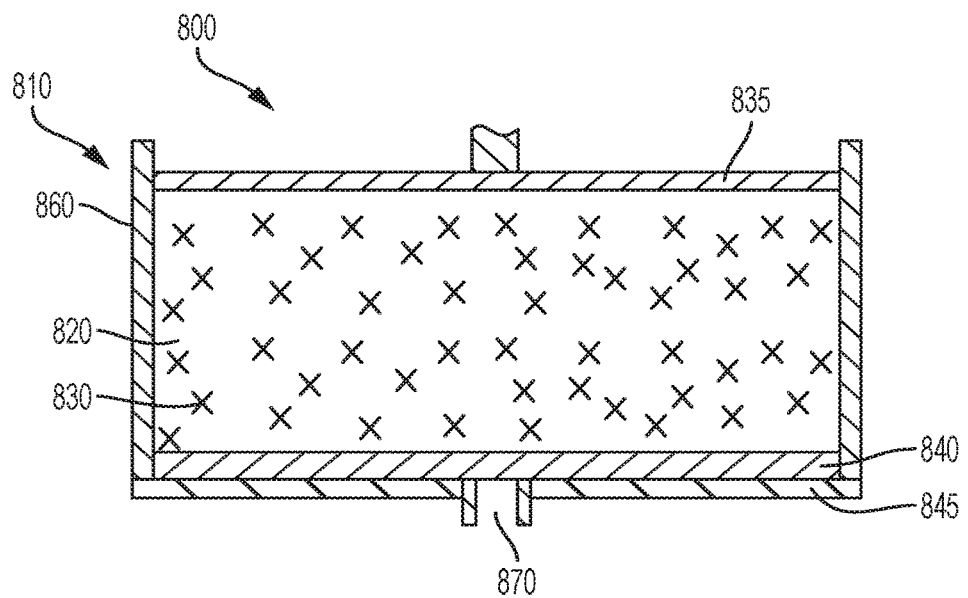

FIG. 14 illustrates a filter structure 800 having a container 810, side walls 860, a diffuser plate 840, an end wall 845, which together define a volume 820. Nanostructured carbon 830 may be placed within the volume 820. A piston 835 may compress the nanostructured carbon 830 within the volume 820 of the container 810. The piston 835 may be configured to fit within the walls 860 of the container 810, such that the walls 860 are not compressed by the piston 835. FIG. 14 shows the piston 835 in partial compression of the mass of nanostructured carbon 830, with the piston 835 within the walls 860.

Figure 15:
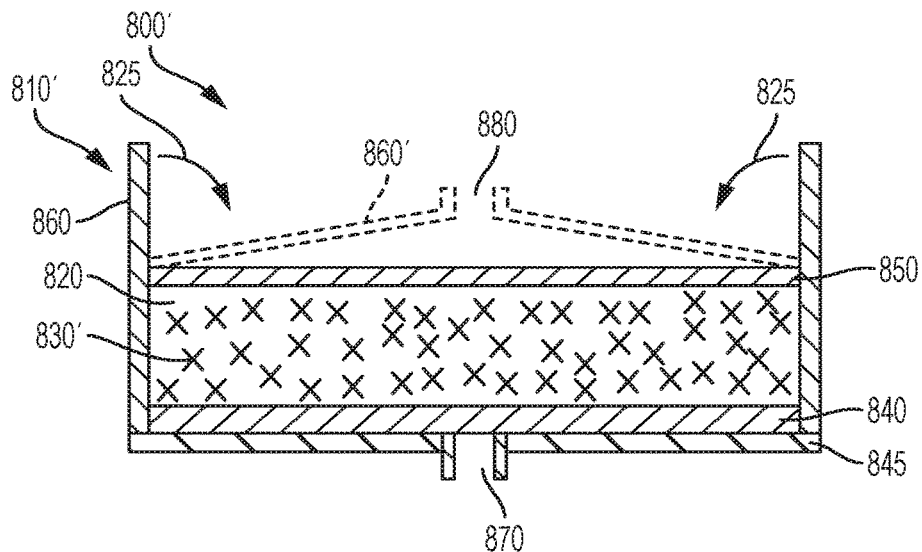

FIG. 15 shows a structure 800' and container 810' after compression by the piston 835 shown in FIG. 14. Compressed nanostructured carbon 830' is shown encased on opposite sides by side walls 860, and further encased on a top side by a porous diffuser plate 850 and an opposing bottom side by the porous diffuser plate 840. The porous diffuser plate 840 is supported by end wall 845 having an inlet 870 therein. The inlet 870 may be configured to be coupled to an exterior system from which gases or other fluids may flow to the filter structure 800. The opening 870 may be connected to the gas and/or fluid source by a hose, a threaded pipe fitting, a weldable pipe fitting, or a nipple fitting.

After forming the compressed nanostructured carbon 830' (i.e., by compressing the nanostructured carbon 830) and placing the porous diffuser plate 850 over the compressed nanostructured carbon 830', the side walls 860 may be folded or crimped downward and inward in the directions shown by arrows 825, forming folded side walls 860' (represented as dashed lines), sealing closed the filter structure 800. After or during the formation of the folded side walls 860', an outlet opening 880 may be added to the enclosure formed by folded side walls 860'. Gases and fluids may then pass from inlet opening 870 through the porous lower enclosure wall 840, through the mass of compressed nanostructured carbon 830' and the porous upper enclosure wall 850 and out of outlet opening 880. The outlet opening 880 may be configured to be coupled to an exterior system to which gases or other fluids flow from the filter structure 800. The outlet opening 880 may be connected to the exterior system by a hose, a threaded pipe fitting, a weldable pipe fitting, or a nipple fitting. In some embodiments, the sidewalls may be cut or sheared away above the porous diffuser plate 850 and a lid having an outlet opening may be fastened to the remaining walls 860, similar to methods previously discussed herein. In some embodiments, pellets of compressed nanostructured carbon may be placed in the container 810'. In certain embodiments, the compressed nanostructured carbon may be coated with a porous coating to form a filter medium, before the filter medium is placed in a container 810'.

Figure 16:
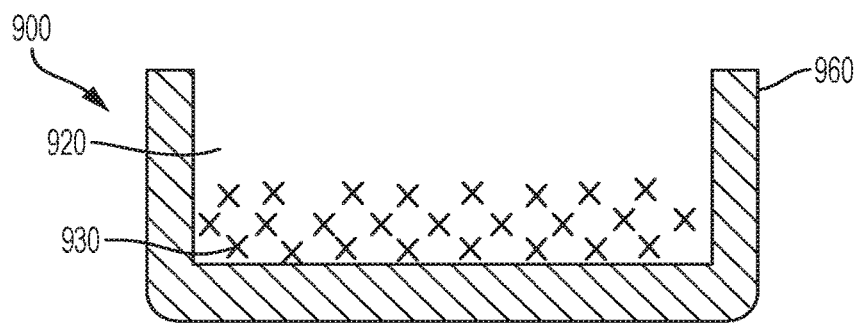
Figure 17:
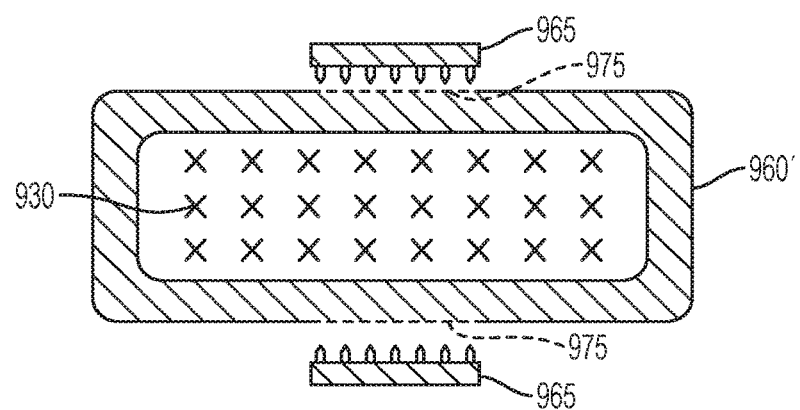

FIG. 16 shows a filter structure 900 including walls 960 and a volume 920 containing a mass of compressed nanostructured carbon 930. The filter structure 900 may be formed, for example, from a curable polymer material. The walls 960 may be folded over the mass of compressed CNTs 930 to form the enclosed filter structure 900 having folded walls 960' shown in FIG. 17. After the folded walls 960' have been folded, the polymer material may be cured, encasing the compressed nanostructured carbon 930 within the filter structure 900. A punch 965 may be used to puncture the filter structure 900 with holes 975 to provide a path for a fluid to pass through the filter structure 900.

What is claimed is:

1. A method of forming a composite structure, the method comprising:
   enclosing a plurality of particles of nanostructured carbon in a container having at least one compressible sidewall; and
   compressing the nanostructured carbon in the container to form a densified porous mass of the nanostructured carbon.

2. The method of claim 1, wherein compressing the nanostructured carbon comprises uniaxially compressing the nanostructured carbon in the container.

3. The method of claim 1, further comprising compressing the at least one compressible sidewall while compressing the nanostructured carbon in the container.

4. The method of claim 1, wherein compressing the nanostructured carbon comprises compressing the nanostructured carbon to have a bulk density from about 0.8 g/cm3 to about 2.2 g/cm3.

5. The method of claim 1, wherein compressing the nanostructured carbon comprises applying a pressure from about 10 MPa to about 1000 MPa to the nanostructured carbon.

6. The method of claim 1, further comprising forming a compressed container substantially filled with the densified porous mass of nanostructured carbon.

7. The method of claim 1, further comprising securing a lid to an end of the container.

8. The method of claim 7, wherein securing the lid to an end of the container comprises crimping the lid to the compressible sidewall.

9. The method of claim 1, further comprising heating the mass of nanostructured carbon to a temperature from about 1,500° C. to about 2,000° C.

10. The method of claim 1, wherein compressing the nanostructured carbon comprises compressing the nanostructured carbon in an inert atmosphere.

11. The method of claim 10, wherein compressing in an inert atmosphere comprises compressing in an atmosphere of N2.

12. The method of claim 1, wherein enclosing a plurality of particles of nanostructured carbon in a container comprises enclosing a plurality of carbon nanotubes in the container.

13. The method of claim 1, wherein enclosing a plurality of particles of nanostructured carbon in a container comprises enclosing a plurality of carbon nanofibers in the container.

14. A method of forming a filter medium of compressed carbon nanotubes, the method comprising:
   compressing a mass of nanostructured carbon in a container to form a compressed mass of nanostructured carbon;
   coating the compressed mass of nanostructured carbon with a porous coating material to form a filter medium; and
   placing the filter medium within a filter housing.

15. A method of forming a filter medium of compressed nanostructured carbon, the method comprising:
   compressing a mass of pellets formed from nanostructured carbon; and
   placing the mass of pellets within a filter housing.

* * * * *